United States Patent
Balakrishnan et al.

(10) Patent No.: US 10,382,266 B1
(45) Date of Patent: *Aug. 13, 2019

(54) INTERCONNECTION PLATFORM WITH EVENT-DRIVEN NOTIFICATION FOR A CLOUD EXCHANGE

(71) Applicant: Equinix, Inc., Redwood City, CA (US)

(72) Inventors: Senthil Kumar Balakrishnan, Santa Clara, CA (US); Parveen Kumar, Fremont, CA (US); Jaganathan Jeyapaul, San Jose, CA (US); Brian J. Lillie, Los Altos, CA (US); Harshith Bhaskar Vakkaligara, Fremont, CA (US)

(73) Assignee: EQUINIX, INC., Redwood City, CA (US)

( * ) Notice: Subject to any disclaimer, the term of this patent is extended or adjusted under 35 U.S.C. 154(b) by 350 days.

This patent is subject to a terminal disclaimer.

(21) Appl. No.: 15/071,687

(22) Filed: Mar. 16, 2016

(51) Int. Cl.
| | |
|---|---|
| *H04L 12/28* | (2006.01) |
| *H04L 12/24* | (2006.01) |
| *H04L 29/08* | (2006.01) |
| *H04L 29/12* | (2006.01) |
| *H04L 12/947* | (2013.01) |
| *H04L 29/06* | (2006.01) |

(52) U.S. Cl.
CPC ............ *H04L 41/082* (2013.01); *H04L 49/25* (2013.01); *H04L 61/2007* (2013.01); *H04L 67/02* (2013.01); *H04L 67/10* (2013.01); *H04L 67/26* (2013.01); *H04L 69/16* (2013.01)

(58) Field of Classification Search
CPC ......... H04L 67/10; H04L 67/02; H04L 49/25; H04L 61/2007; H04L 67/26; H04L 69/16

USPC ........................................................ 709/221
See application file for complete search history.

(56) References Cited

U.S. PATENT DOCUMENTS

| | | | |
|---|---|---|---|
| 6,608,831 B1 * | 8/2003 | Beckstrom | H04L 12/5601 370/352 |
| 6,778,503 B1 | 8/2004 | Sproat et al. | |
| 7,512,065 B1 * | 3/2009 | Phadnis | H04L 47/15 370/230 |
| 7,865,596 B2 * | 1/2011 | Grosner | G06F 17/30067 709/213 |
| 7,908,359 B1 | 3/2011 | Soph | |
| 8,379,656 B2 | 2/2013 | Waldrop et al. | |
| 8,509,249 B2 | 8/2013 | Waldrop et al. | |
| 8,537,845 B2 | 9/2013 | Waldrop et al. | |

(Continued)

OTHER PUBLICATIONS

Final Office Action from U.S. Appl. No. 15/343,431, dated Jun. 6, 2016, 21 pp.

(Continued)

*Primary Examiner* — Tu T Nguyen
(74) *Attorney, Agent, or Firm* — Shumaker & Sieffert, P.A.

(57) ABSTRACT

In one example, described herein is an interconnection platform for dynamically configuring and managing a cloud-based services exchange, or "cloud exchange," to facilitate virtual interconnections ("virtual circuits") for cloud services delivery from cloud service providers to one or more cloud customers. As described herein, the interconnection platform facilitates event-driven notification to push virtual circuit configuration status updates to customer systems of customers of the cloud exchange provider that interface with the interconnection platform.

21 Claims, 8 Drawing Sheets

(56) References Cited

U.S. PATENT DOCUMENTS

| | | | |
|---|---|---|---|
| 8,787,154 B1* | 7/2014 | Medved | H04L 45/64 |
| 2002/0071545 A1 | 6/2002 | Burns | |
| 2003/0189919 A1 | 10/2003 | Gupta et al. | |
| 2004/0073646 A1 | 4/2004 | Cho et al. | |
| 2007/0050340 A1 | 3/2007 | von Kaenel et al. | |
| 2009/0161681 A1* | 6/2009 | Madrahalli | H04Q 11/0062 370/401 |
| 2009/0245265 A1 | 10/2009 | Takeshima et al. | |
| 2010/0088755 A1 | 4/2010 | Gotare | |
| 2011/0058547 A1 | 3/2011 | Waldrop et al. | |
| 2012/0317214 A1 | 12/2012 | Brunner et al. | |
| 2013/0167124 A1 | 6/2013 | Amit et al. | |
| 2014/0181256 A1 | 6/2014 | Trifa et al. | |
| 2015/0195178 A1 | 7/2015 | Bhattacharya et al. | |
| 2016/0077975 A1* | 3/2016 | Stabrawa | G06F 3/0604 711/209 |
| 2016/0080485 A1* | 3/2016 | Hamedi | H04L 67/02 709/204 |
| 2016/0127454 A1 | 5/2016 | Maheshwari et al. | |
| 2016/0142428 A1* | 5/2016 | Pastore | H04L 63/1466 726/23 |
| 2016/0285640 A1* | 9/2016 | Kapur | H04L 12/10 |

OTHER PUBLICATIONS

Office Action from U.S. Appl. No. 15/343,431, dated Feb. 14, 2017, 16 pp.
Response to Office Action from U.S. Appl. No. 15/343,431 dated Feb. 14, 2017, filed May 15, 2017, 27 pp.
Advisory Action from U.S Appl. No. 15/343,431, dated Sep. 28, 2017, 3 pp.
Office Action from U.S. Appl. No. 15/343,431, dated Nov. 9, 2017, 20 pp.
Amendment in Response to Office Action dated Jun. 6, 2017, from U.S. Appl. No. 15/343,431, filed Sep. 6, 2017, 21 pp.
U.S. Appl. No. 15/001,766, by Ravindra JN Rao, filed Jan. 20, 2016.
Response to the Office Action dated Nov. 9, 2017, from U.S. Appl. No. 15/343,431, filed Feb. 9, 2018, 10 pp.
Response to Office Action dated Sep. 6, 2018 in U.S. Appl. No. 15/343,431, filed Jan. 7, 2019, 21 pp.
Final Office Action from U.S. Appl. No. 15/343,431, dated May 23, 2018, 23 pp.
Amendment in Response to Office Action dated May 23, 2018, from U.S. Appl. No. 15/343,431, filed Jul. 23, 20118, 22 pp.
Advisory Action from U.S Appl. No. 15/343,431, dated Aug. 2, 2018, 2 pp.
Office Action from U.S. Appl. No. 15/343,431, dated Sep. 6, 2018, 20 pp.
Final Office Action from U.S. Appl. No. 15/343,431, dated Feb. 11, 2019, 21 pages.
Response to Final Office Action filed in U.S. Appl. No. 15/343,431 dated May 13, 2019, 8 pages.
Advisory Action issued in U.S Appl. No. 15/343,431, dated Jun. 6, 2019, 3 pages.

* cited by examiner

US 10,382,266 B1

INTERCONNECTION PLATFORM WITH EVENT-DRIVEN NOTIFICATION FOR A CLOUD EXCHANGE

TECHNICAL FIELD

The invention relates to computer networks and, more specifically, to a platform facilitating interconnections among cloud service customers and cloud service providers.

BACKGROUND

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

SUMMARY

In general, this disclosure describes an interconnection platform for dynamically configuring and managing a cloud-based services exchange, or "cloud exchange," to facilitate virtual interconnections ("virtual circuits") for cloud services delivery from cloud service providers to one or more cloud customers. As described herein, the interconnection platform facilitates event-driven notification to push virtual circuit configuration status updates to customer systems that interface with the interconnection platform for customers of the cloud exchange provider.

In some examples, the interconnection platform for a cloud exchange exposes a collection of software interfaces, also referred to herein and described according to application programming interfaces (APIs), that allow access to capabilities and assets of the interconnection platform in a programmable fashion. As such, the software interfaces provide an extensible framework that allows software developers associated with customers and partners of the exchange to build software applications that access the interconnection platform that automatically manage interconnection with multiple cloud service providers participating in the interconnection platform. In other words, developers from network services providers, cloud service providers, managed service providers and other enterprises may use the software interfaces exposed by the interconnection platform and defined by the APIs to build custom applications and frameworks for seamless interaction with the interconnection platform to facilitate the delivery of cloud services from cloud service providers to cloud customers (such as enterprises).

The software interfaces defined at least in part by the APIs enable machine-to-machine communication for near real-time setup and modifications of interconnections, and may also eliminate or reduce the need for human interaction for the entire virtual circuit setup and management process. In this way, the software interfaces provide an automated and seamless way to establish, un-install, and manage virtual circuits with multiple cloud providers participating in an interconnection platform.

The software interfaces defined at least in part by the APIs offer, to customer systems that interface with the interconnection platform for customers of the cloud exchange provider, event-driven or "push" notifications that allow the customers to receive status updates for virtual circuit operations without having to continually poll the interconnection platform. A virtual circuit operation, such as a provisioning or de-provisioning a virtual circuit, requested by a customer may in some cases proceed according to a multi-step workflow performed by the interconnection platform and involving multiple sub-systems of the cloud exchange. Steps of a virtual circuit configuration workflow, when completed, may transition a state machine for the virtual circuit configuration operation to a new state that is accorded a particular virtual circuit status for the virtual circuit being operated on. The interconnection platform, on transitioning to a new state with a new virtual circuit status, sends an indication of the new virtual circuit status to the customer. In this way, the customer does not need to poll the interconnection platform to obtain updates to the virtual circuit status, which may reduce the computing resource and network load on both the interconnection platform and customer systems. In addition, the techniques may improve a responsiveness of the customer workflow with regard to a virtual circuit operation by facilitating near real-time notification of the customer systems with regard to the virtual circuit status.

In some examples, a method comprises receiving, by an interconnection platform for configuring a plurality of interconnection assets of a network data center and from a first customer system of a first customer of a provider of the network data center, a virtual circuit configuration request to configure a virtual circuit for the interconnection assets that interconnects a first customer network associated with the first customer and a second customer network associated with a second customer of the provider of the network data center; receiving, by the interconnection platform from the first customer system, an indication of a computing device of the first customer system; configuring, by the interconnection platform in response to the virtual circuit configuration request, the virtual circuit according to a configuration workflow for the virtual circuit configuration request; and sending, by the interconnection platform to the computing device of the first customer system and in response to determining the configuration workflow has transitioned to a state having a virtual circuit status for the virtual circuit that differs from a previous virtual circuit status for the virtual circuit, a virtual circuit status update that indicates the virtual circuit status.

In some examples, a cloud exchange comprises a network data center comprising a plurality of interconnection assets, the interconnection assets comprising a plurality of ports by which a first customer network associated with a first customer of a provider of the network data center and a second customer network associated with a second customer of the provider of the network data center connect to the network data center; an interconnection platform configured for execution by one or more management devices of the provider of the network data center to configure the interconnection assets, the interconnection platform configured to: receive, from a first customer system of the first customer, a virtual circuit configuration request to configure a virtual circuit that interconnects the first customer network associated with the first customer and the second customer network associated with the second customer; receive, from the first customer system, an indication of a computing device of the first customer system; configure, in response to the virtual circuit configuration request, the virtual circuit for the interconnection assets according to a configuration workflow for the virtual circuit configuration request; and send, to the computing device of the first customer system and in response to a determination that the configuration workflow has transitioned to a state having a virtual circuit status for the virtual circuit that differs from a previous virtual circuit status for the virtual circuit, a virtual circuit status update that indicates the virtual circuit status.

In some examples, a system comprises a network data center comprising a plurality of interconnection assets, the interconnection assets comprising a plurality of ports by which a first customer network associated with a first customer of a provider of the network data center and a second customer network associated with a second customer of the provider of the network data center connect to the network data center; an interconnection platform configured for execution by one or more management devices of the provider of the network data center to configure the interconnection assets, the interconnection platform comprising: an application programming interface gateway configured to: receive, from a first customer system of the first customer, a virtual circuit configuration request to configure a virtual circuit that interconnects the first customer network associated with the first customer and the second customer network associated with the second customer; and receive, from the first customer system, an indication of a computing device of the first customer system; a plurality of microservices; and an orchestration engine configured to: receive an indication of the virtual circuit configuration request from the application programming interface gateway; orchestrate the plurality of microservices to configure the virtual circuit according to a configuration workflow for the virtual circuit configuration request; and send, to the computing device of the first customer system via the application programming interface gateway and in response to a determination that the configuration workflow has transitioned to a state having a virtual circuit status for the virtual circuit that differs from a previous virtual circuit status for the virtual circuit, a virtual circuit status update that indicates the virtual circuit status.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

In general, this disclosure describes an interconnection platform for real-time configuration and management of a cloud-based services exchange ("cloud exchange") with event-driven push notifications of configuration status updates for virtual circuits. As described herein, the interconnection platform provides customers of the exchange, e.g., enterprises, network carriers, and SaaS customers, with secure, private, virtual connections ("virtual circuits") to multiple cloud service providers (CSPs) globally. The multiple CSPs participate in the cloud exchange by virtue of their having at least one accessible port in the cloud exchange by which a customer can connect to the one or more cloud services offered by the CSPs, respectively. Thus, private networks of any customer to be directly cross-connected using virtual circuits to any other customer at a common point, thereby allowing direct exchange of network traffic between the networks of the customers. Customers may include network carriers (or network service providers), enterprises, and other users of cloud services offered by one or more cloud service providers.

Figure 1A:
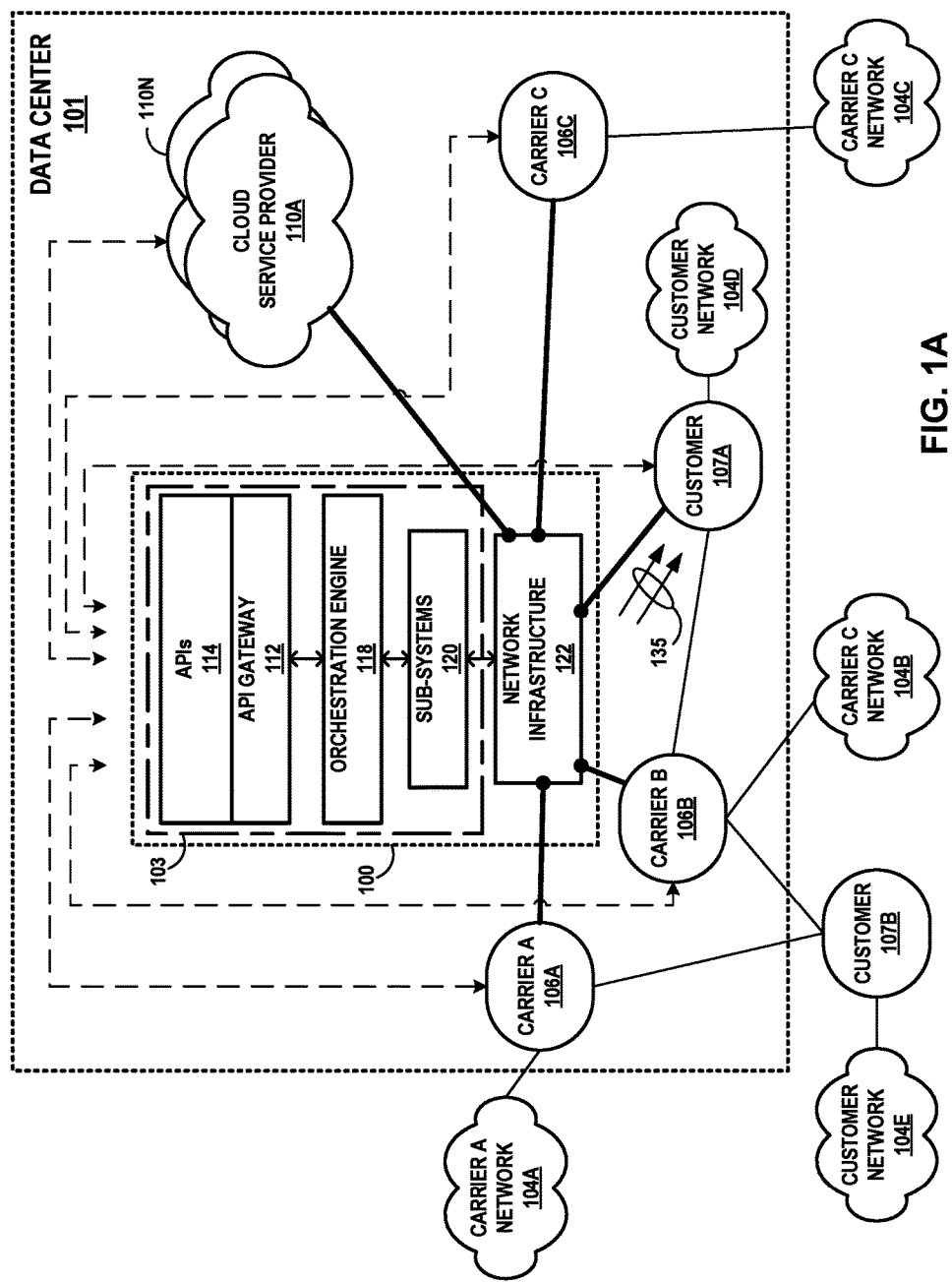
FIG. 1A is a block diagram that illustrates a high-level view of a data center that provides an operating environment for a cloud-based services exchange, in accordance with techniques described herein.

FIG. 1A is a block diagram that illustrates a high-level view of a data center 101 that provides an operating environment for a cloud-based services exchange 100. Cloud-based services exchange 100 ("cloud exchange 100") allows a corresponding one of customer networks 104D, 104E and carrier networks 104A-104C (collectively, "private networks 104") of any carriers 106A-106C (collectively, "carriers 106") or other cloud customers including enterprise customers 107A, 107B to be directly interconnected, via a virtual layer 2 (L2) or layer 3 (L3) connection to any other customer network and/or to any of cloud service providers 110A-110N (collectively, "CSPs 110"), thereby allowing direct exchange of network traffic among the customer networks and CSPs 110. As used herein, a "cloud customer" refers to a consumer of cloud services provided by a cloud service provider, a "cloud provider" or "cloud service provider" refers to a provider of cloud services. A "customer" may refer to a cloud customer or more broadly to a customer of the facility provider that deploys the one or more network data centers that host the exchange. Customers of the facility provider may include cloud customers, carriers, and cloud service providers, or other companies that co-locate in the network data centers of the facility provider.

Carriers 106 may each represent a network service provider that is associated with a transit network by which network subscribers of the carrier 106 may access cloud services offered by CSPs 110 via the cloud exchange 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 100.

In this way, cloud exchange 100 streamlines and simplifies the process of partnering CSPs 110 and customers (via carriers 106 or directly) in a transparent and neutral manner. One example application of cloud exchange 100 is a co-location and interconnection data center in which CSPs 110 and carriers 106 and/or customers 107 may already have network presence, such as by having one or more accessible ports available for interconnection within the data center. This allows the participating carriers, customers, and CSPs to have a wide range of interconnectivity options in the same facility. Cloud exchange 100 of data center 101 includes network infrastructure 122 that provides a L2/L3 switching fabric by which CSPs 110 and customers/carriers interconnect. This enables a carrier/customer to have options to create many-to-many interconnections with only a one-time hook up to the switch fabric and underlying interconnection platform 103 of cloud exchange 100. In other words, instead of having to establish separate connections across transit networks to access different cloud service providers or different cloud services of one or more cloud service providers, cloud exchange 100 allows customers to interconnect to multiple CSPs and cloud services using network infrastructure 122 within data center 101. The switching fabric of network infrastructure 122 may comprises an L3 autonomous system.

By being connected to and utilizing cloud exchange 100, customers can purchase services and reach out to many end users in many different geographical areas without incurring the same expenses typically associated with installing and maintaining multiple virtual connections with multiple CSPs 110. For example, carrier 106A can expand its services using network 104D of carrier 106D. By connecting to cloud exchange 100, a carrier 106 may be able to generate additional revenue by offering to sell its network services to the other carriers. For example, carrier 106D can offer the opportunity to use carrier network 104D to the other carriers.

Cloud exchange 100 includes an interconnection platform 103 that exposes a collection of software interfaces, also referred to herein as application programming interfaces (APIs) 114 in that the APIs 114 define the methods, fields, and/or other software primitives by which applications may invoke the interconnection platform 103 to configure virtual connections the cloud exchange 100. The software interfaces allow carriers 106 and customers 107 programmatic access to capabilities and assets of the cloud exchange 100.

On the buyer side, the software interfaces presented by the underlying interconnect platform provide an extensible framework that allows software developers associated with the customers of cloud exchange 100 to create software applications that allow and leverage access to the interconnect platform 103 by which the applications may request that the cloud exchange 100 be configured with virtual circuit-based connectivity to cloud services offered by any of the CSPs 110. For example, these buyer-side software interfaces (or "buyer APIs" of APIs 114) may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services (including dynamic selection of bandwidth based on a purchased cloud service to create on-demand and need based virtual circuits to cloud service providers), delete virtual circuits, obtain active virtual circuit information, obtain details surrounding CSPs partnered with the cloud exchange provider, obtain customized analytics data, and validate partner access to interconnection assets.

On the cloud provider (seller) side, the software interfaces may allow software developers associated with cloud providers to manage their cloud services and to enable customers to connect to their cloud services. For example, these seller-side software interfaces (or "seller APIs" of APIs 114) may allow cloud provider applications to obtain authorization to access the cloud exchange, obtain information regarding available cloud services, obtain active ports and metro area details for the provider, obtain active port details in a given data center for the provider, approve or reject virtual circuits of varying bandwidth to access cloud services created by customers, obtain virtual circuits pending addition and confirm addition of virtual circuits, obtain virtual circuits pending deletion and confirm deletion of virtual circuits, obtain customized analytics data, and validate partner access to interconnection assets.

The APIs 114 thus facilitate machine-to-machine communication to enable dynamic provisioning of virtual circuits in the cloud exchange for interconnecting customer and provider networks. In this way, the interconnection platform 103 enables the automation of aspects of cloud services provisioning. For example, the software interfaces may provide an automated and seamless way for customers to establish, de-install and manage interconnection with multiple, different cloud providers participating in the cloud exchange.

According to techniques described in this disclosure, the software interfaces defined at least in part by the APIs 114 offer, to customers of the cloud exchange 100 provider, event-driven or "push" notifications that allow the customers to receive status updates for virtual circuit operations without having to continually poll the interconnection platform. In other words, rather than sending virtual circuit configuration status updates only in response to requests from a customer system, interconnection platform 103 may provide send such updates in response to determining that a virtual circuit configuration status has changed, in some cases in near real-time. In examples, the even-driven notifications may be made available to buyers such as enterprise customers 107 and carriers 106, sellers such as CSPs 110, or both buyers and sellers of cloud services. In this way, a customer that has requested a virtual circuit operation via APIs 114 does not need to poll the interconnection platform 103 to obtain updates to the virtual circuit status. The technique may reduce the computing resource and network load on both the customer systems and on the interconnection platform. In addition, the techniques may improve a responsiveness of the customer workflow with regard to a virtual circuit operation by facilitating near real-time notification of the customer systems with regard to the virtual circuit status.

In some examples, cloud exchange 100 includes an API gateway 112 having one or more processors that executes one or more applications that expose software interfaces defined according to APIs 114. The applications may invoke services that correspond to endpoints of the APIs 114, and the services may themselves invoke the cloud exchange platform service of orchestration engine 118. API gateway 112 may execute on a management device such as one or virtual machines and/or real servers of data center 101. Although shown as a single element in FIG. 1A, API gateway 112 may comprise a cluster of one or more physical and/or virtual computing machines executing on one or more physical processors.

In some examples, cloud exchange includes an orchestration engine 118 that organizes, directs and integrates underlying software sub-systems 120 for managing various aspects of interconnection within the network infrastructure 122 as well as cloud services management. The orchestration engine 118 may, for example, provide a rule-drive workflow engine that operates between the APIs 114 and the underlying interconnect platform of cloud exchange 100 that includes sub-systems 120 and network infrastructure 122. In this way, the orchestration engine 118 can be used by customer-proprietary applications and the APIs 114 for direct participation with the interconnection platform 103 of the cloud exchange 100. In other words, the orchestration engine 118 offers a "cloud exchange platform service" having various application engines or workflows to handle the API gateway 112 service requests.

Sub-systems 120 and orchestration engine 118 may each be centralized or distributed applications and may execute on a management device such as one or virtual machines and/or real servers of data center 101.

Network infrastructure 122 represents the cloud exchange switching fabric and includes multiple ports that may be dynamically interconnected with virtual circuits using by invoking APIs 114 according to techniques described herein. Each of the ports is associated with one of carriers 106, customers 107, and CSPs 110. A virtual circuit may refer to, e.g., an Ethernet or other L2 connection such as a Layer 2 VPN or virtual private LAN (e.g., E-LINE, E-LAN, E-TREE, or E-Access), an Internet exchange-based interconnection in which respective routers of interconnected customers directly peer and exchange layer 3 routes for service traffic exchanged via the exchange 100, and a cloud exchange in which customer routers peer with exchange 100 (or "provider") routers rather than directly with other customers using a Layer 3 VPN.

Figure 1B:
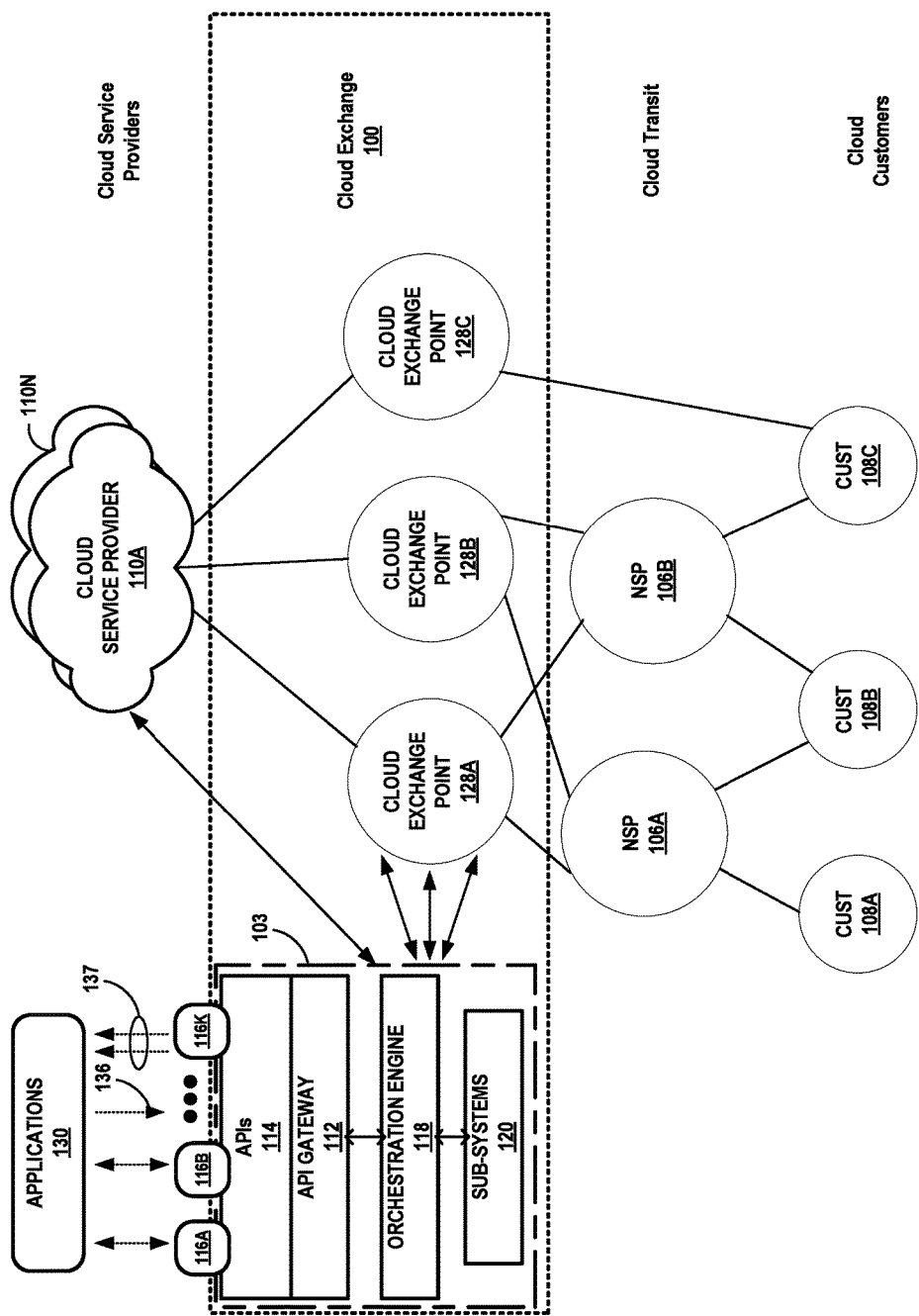
FIG. 1B is a block diagram that illustrates cloud-based services exchange, in accordance with techniques described here.

Although interconnection platform 103 is depicted in FIGS. 1A-1B and described above with respect to a particular architecture, interconnection platform 103 may execute at least in part according to different architectures. For example, a single computing device may execute API gateway 112, orchestration engine 118, and/or one or more of sub-systems 120.

For interconnections at layer-3 or above, customers 107 and carriers 106 may receive services directly via a layer 3 peering and physical connection to exchange 100 or indirectly via one of carriers 106. Carriers 106 provide "transit" by maintaining a physical presence within one or more of exchanges and aggregating layer 3 access from one or customers 107. Carriers 106 may peer, at layer 3, directly with one or more exchanges and in so doing offer indirect layer 3 connectivity and peering to one or more customers 107 by which customers 107 may obtain services from the exchange 100. Cloud exchange 100 may in some cases provide a Carrier Ethernet Exchange to enable aggregated layer 2 access by carriers 106 for enterprise customers 107.

Further example details of a cloud exchange can be found in U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and in U.S. patent application Ser. No. 15/001,766, filed Jan. 20, 2016 and entitled "MULTI-CLOUD, MULTI-SERVICE DATA MODEL;" each of which are incorporated herein by reference in their respective entireties.

According to techniques described herein, interconnection platform 103 sends, to customers of the cloud exchange provider (e.g., CSPs 110 or customers 107), event-driven or "push" notifications that allow the customers to receive virtual circuit status updates 135 for virtual circuit configuration operations without having to continually poll the interconnection platform. A virtual circuit configuration operation, such as a provisioning or de-provisioning a virtual circuit, requested by a customer may in some cases transition among a plurality of virtual circuit statuses that each indicates a different state for the virtual circuit configuration operation. The interconnection platform 103, on transitioning to a new state with a new virtual circuit status, sends an indication of the new virtual circuit status to the customer. In this way, the customer does not need to poll the interconnection platform 103 to obtain updates to the virtual circuit status, which may reduce the computing resource and network load on both the cloud exchange provider and customer systems. In addition, the techniques may improve a responsiveness of the customer workflow with regard to a virtual circuit operation by facilitating near real-time notification of the customer systems with regard to the virtual circuit status.

FIG. 1B is a block diagram that illustrates cloud-based services exchange 100, in accordance with some example implementations described here. In this example architecture, cloud exchange 100 includes multiple cloud exchange points 128A-128C (also described as "cloud exchange points" and collectively referred to as "cloud exchange points 128"), which may represent geographically distributed data centers within a metropolitan area and in which cloud exchange 100 may directly or indirectly (via NSPs 106) interconnect cloud services providers 110 with cloud customers 108 accessing cloud services.

Applications 130 developed and deployed by CSPs 110, NSPs 106, and customers 108 invoke APIs 114 of interconnection platform 103 to, for example, automatically control provisioning and manage aspects of cloud exchange 100 for aspects of interconnection with one or more cloud providers/customers, including: (1) provisioning of interconnects, (2) identification and authorization of carriers, (3) management and fulfillment of orders, (4) delivery of network services, (5) managing inventory and capacity, (6) managing and reporting/alerting incidents, and (7) content management.

In this example, APIs 114 includes endpoints 116A-116K (collectively, "endpoints 116") that each represents a resource exposed by interconnection platform 103. Examples of endpoints are described below in further detail with respect to FIG. 3A. Applications 130 may interact with API gateway 112 according to client/server model. Applications 130 may send a request directed to any of endpoints 116 of APIs 114. API gateway 112, in response to requests, invokes the cloud exchange platform service of orchestration engine 118, which may orchestrate a workflow of service tasks for the underlying sub-systems 120 to satisfy the request. In response to the request, e.g., upon completion of the workflow, API gateway 112 may send a response to the requesting application 130 from the endpoint 116 invoked.

In some examples, APIs 114 may conform to a Representational State Transfer model, i.e., be a RESTful interface, with endpoints 116 representing different methods of the RESTful interface. Applications 130 may invoke any of endpoints 116 using a communication protocol for transferring application data (e.g. HTTP) that specifies the method, a resource Uniform Resource Identifier (URI), and optionally parameters for the method. API gateway 112 translates the resource URI and the optional parameters to cloud exchange platform-related constructs and invokes the cloud exchange platform of orchestration engine 118 according to one of a create, read, update, and delete (CRUD) or confirmation action corresponding to the endpoint 116 specified by the application data. In HTTP parlance, the create action corresponds to the POST method, read to the GET method, and confirmation to the PATCH method, for example.

One or more endpoints 116 represent endpoints for virtual circuit resources, for receiving requests to create new virtual circuits, update existing virtual circuits, delete existing virtual circuits, or obtain details for existing virtual circuits. For example and as described in further detail below, endpoint 116A may represent a /virtualcircuits endpoint for performing the above-described operations. Requests to create (or "provision") new virtual circuits, update existing virtual circuits, and delete (or "de-provision") existing virtual represent requests to configure a virtual circuit. On receiving a request to configure a virtual circuit, such as virtual circuit configuration request 136, interconnection platform 103 in some examples initiates a workflow to satisfy the request. Steps of the virtual circuit workflow, when completed, may transition a state machine for the virtual circuit configuration operation to a new state that is accorded a particular virtual circuit status for the virtual circuit being configured. Different configuration requests (e.g., provision, update, de-provision) may correspond to different virtual circuit configuration workflows.

In accordance with techniques described in this disclosure, endpoints 116 for virtual circuits in some examples are configured to receive one or more parameters whereby a customer system may register to receive, from interconnection platform 103, event-driven push notifications in the form of virtual circuit status updates 137 including indications of virtual circuit statuses for the virtual circuits being configured, responsive to virtual circuit configuration requests from the requesting customer system. In some examples, the parameters include a virtual circuit notification parameter. The virtual circuit notification parameter may be provisioned with a Uniform Resource Identifier (URI), such as a Uniform Resource Locator (URL), that identifies a resource to which the interconnection platform 103 may send indications of virtual circuit statuses for the virtual circuits being configured.

Alternatively or additionally, in some examples, having made a request to endpoints 116 to configure a virtual circuit, the requesting customer system and interconnection platform 103 maintain a Transmission Control Protocol (TCP) communication session for a HyperText Transfer Protocol (HTTP) session for the duration of the workflow. The interconnection platform 103, in response to completing a step of a virtual circuit configuration workflow that transitions a virtual circuit status to a new status and without having received a request for a status update, may send an HTTP POST payload to the requesting customer system that includes an indication of the new virtual circuit status for the virtual circuit being configured. In this way, the requesting system may receive near real-time virtual circuit status updates without having to poll any of endpoints 116 exposed by the interconnection platform 103. Virtual circuit configuration request 136 may represent an HTTP request to one of endpoints 116. Virtual circuit status updates 137 may represent HTTP requests or HTTP responses that each includes an HTTP body indicating the state of a virtual circuit.

Sub-systems 120 may apply the service tasks orchestrated by orchestration engine 118, which may include modifying any of cloud exchange points 128 to perform the on-demand setup of virtual circuits between CSPs 110 and customers 108, for example, or otherwise manage cloud exchange points 128 interconnection assets such as ports, metros, data centers, virtual circuits and virtual circuit bandwidth, profiles, and configuration, as well as other network infrastructure.

Cloud exchange 100 of FIG. 1B illustrates a metro-based cloud exchange that provides multiple cloud exchange points according to techniques described herein. Each of cloud-based services exchange points 128A-128C of cloud-based services exchange 100 may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 100 may include more or fewer cloud exchange points 128. In some instances, a cloud exchange 100 includes just one cloud exchange point 128. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchange 100 having one or more cloud exchange points 128.

In the illustrated example, each of cloud exchange points 128 includes network infrastructure and an operating environment by which cloud customers 108A-108D (collectively, "cloud customers 108") receive cloud services from multiple cloud service providers 110A-110N (collectively, "cloud service providers 110"). Cloud customers 108 may receive cloud services directly via a layer 3 peering and physical connection to one of cloud exchange points 128 or indirectly via one of network service providers 106A-106B (collectively, "NSPs 106," or alternatively, "carriers 106"). NSPs 106 provide "cloud transit" by maintaining a physical presence within one or more of cloud exchange points 128 and aggregating layer 3 access from one or customers 108. NSPs 106 may peer, at layer 3, directly with one or more cloud exchange points 128 and in so doing offer indirect layer 3 connectivity and peering to one or more customers 108 by which customers 108 may obtain cloud services from the cloud exchange 100.

Each of cloud exchange points 128, in the example of FIG. 1B, may be assigned a different autonomous system number (ASN). For example, cloud exchange point 128A may be assigned ASN 1, cloud exchange point 128B may be assigned ASN 2, and so forth. Each cloud exchange point 128 is thus a next hop in a path vector routing protocol (e.g., BGP) path from cloud service providers 110 to customers 108. As a result, each cloud exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, cloud exchange points 128 may internalize the eBGP peering relationships that cloud service providers 110 and customers 108 would maintain on a pair-wise basis. Instead, a customer 108 may configure a single eBGP peering relationship with a cloud exchange point 128 and receive, via the cloud exchange, multiple cloud services from one or more cloud service providers 110. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

Customer 108C is illustrated as having contracted with the cloud exchange provider for cloud exchange 100 to directly access layer 3 cloud services via cloud exchange point 128C and also to have contracted with NSP 106B to access layer 3 cloud services via a transit network of the NSP 106B. Customer 108B is illustrated as having contracted with multiple NSPs 106A, 106B to have redundant cloud access to cloud exchange points 128A, 128B via respective transit networks of the NSPs 106A, 106B. The contracts described above are instantiated in network infrastructure of the cloud exchange points 128 by L3 peering configurations within switching devices of NSPs 106 and cloud exchange points 128 and L3 connections, e.g., layer 3 virtual circuits, established within cloud exchange points 128 to interconnect cloud service provider 110 networks to NSPs 106 networks and customer 108 networks, all having at least one port offering connectivity within one or more of the cloud exchange points 128.

For layer 3 cloud services, a virtual circuit may represent a layer 3 path through an IP/MPLS fabric of one or more of cloud exchange points 128, between an attachment circuit connecting a customer network to the cloud exchange point and an attachment circuit connecting a cloud service provider network to the cloud exchange point. Each virtual circuit may include at least one tunnel (e.g., an LSP and/or Generic Route Encapsulation (GRE) tunnel) having endpoints at the provider edge/autonomous system boundary of the cloud exchange point.

Cloud exchange points 128 may be configured with multiple layer 3 virtual circuits to interconnect customer/NSP networks and cloud service provider networks with end-to-end IP paths. Cloud exchange points 128 may be configured with multiple layer 2 virtual circuits to interconnect customer/NSP networks and cloud service provider networks with layer 2 connectivity. Each of cloud service providers and customers/NSPs may be an endpoint for multiple virtual circuits, with multiple virtual circuits traversing one or more cloud exchange points 128 to connect the endpoints.

Figure 2:
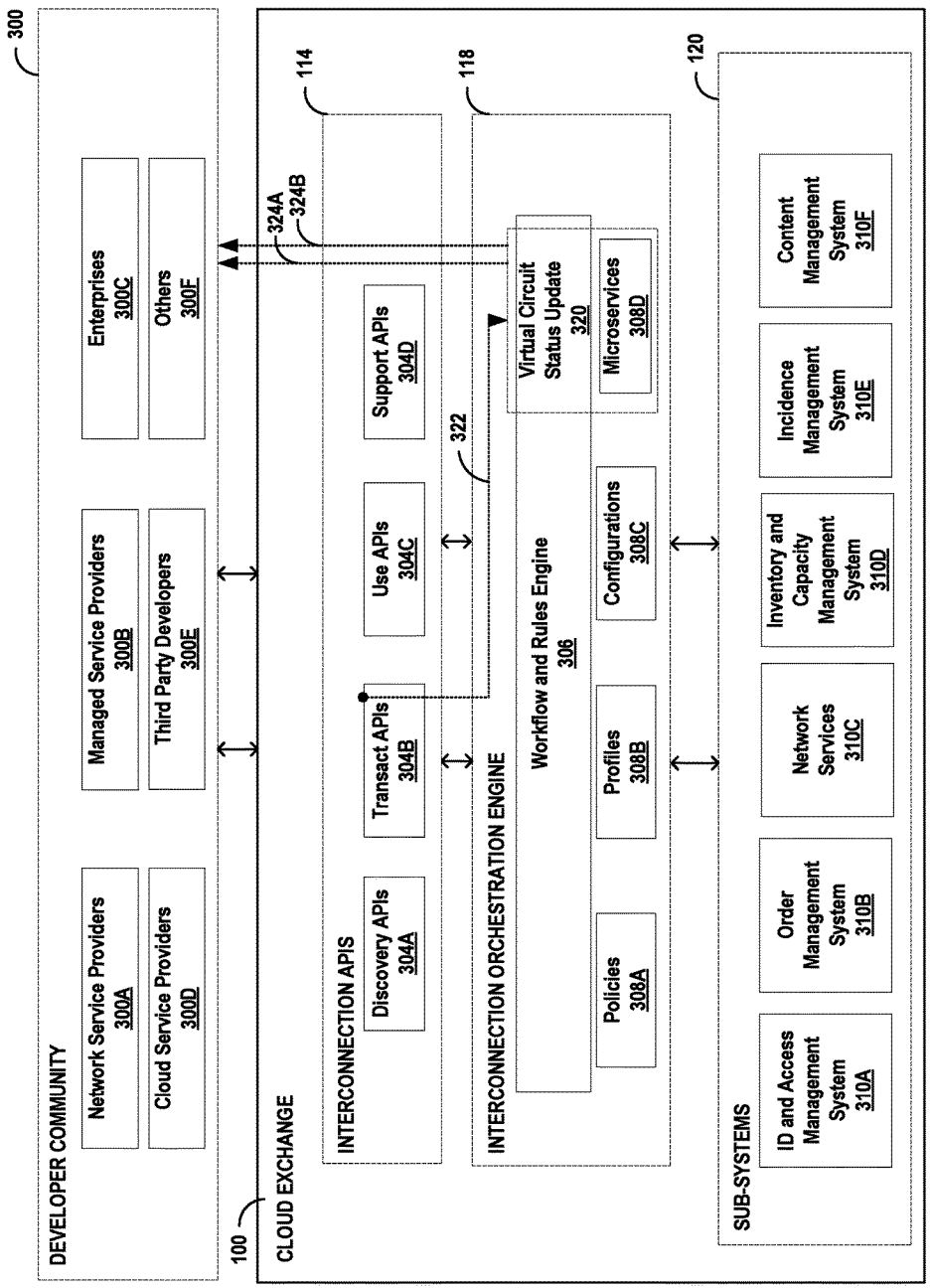
FIG. 2 is a block diagram that illustrates details of an example architecture for a cloud exchange according to techniques described herein.

FIG. 2 is a block diagram that illustrates details of an example architecture for a cloud exchange according to techniques described herein. Cloud exchange 100 may represent an example instance of any of cloud exchanges 100 of FIGS. 1A-1B. As shown in this example instance, cloud exchange 100 depicts APIs 114, internal orchestration engine 118, and sub-systems 120 in further detail.

Developer community 300 illustrates entities that may develop applications that use APIs 114 to access the interconnection platform of the cloud exchange 100. These entities include network service providers 300A, managed service providers 300B, enterprises 300C, cloud service providers 300D, third-party developers 300E, and others 300F. Applications developed by these entities utilize cloud exchange 100 for interconnecting customers to cloud services offered by cloud services providers according to the policies and profiles of the various entities.

In this example, APIs 114 includes bundles of the various API methods or endpoints according to function. Discovery APIs 304A may be usable to perform availability of location discovery, asset discovery, and cloud service discovery. Discoverable information may include available metropolitan areas, data centers, ports, services, virtual circuits, and other interconnection assets by which a customer may obtain or manage cloud services. Transact APIs 304B may be usable to dynamically provision virtual circuits of varying bandwidths through machine-to-machine interaction, validate virtual circuits requested by a customer, and confirm deletion of virtual circuits, for example. Transact APIs 304B may include an interface by which computing systems of any of developer community 300 entities may provide an indication 322 of an endpoint computing device of the computing system.

Interconnection orchestration engine 118 executes virtual circuit status update module 320 to send event-driven push notifications of virtual circuit statuses to the computing device as the cloud exchange 100 executes the virtual circuit configuration transaction. In the example of FIG. 2, virtual circuit status update module 320 sends a virtual circuit status update 324A for a virtual circuit configuration operation to any of entities 300A-300F, the virtual circuit status update 324A including an indication of the current status of the virtual circuit configuration operation. In response to determining that the virtual circuit configuration operation is transitioned to a new status, virtual circuit status update module 320 subsequently sends a virtual circuit status update 324B for the virtual circuit configuration, the virtual circuit status update 324B including an indication of the new status of the virtual circuit configuration operation. Virtual circuit status update module 320 may send the virtual circuit status updates 324A, 324B without having been polled by any member of developer community 300. In some examples, virtual circuit status update module 320 may be executed in part by workflow and rules engine 306 orchestrating the virtual circuit configuration workflow, and in part by microservices 308D for sending the event-driven push notifications of virtual circuit statuses.

Use APIs 304C may be usable to allow providers and customers to dynamically obtain recommendation information as performed by a recommendation engine of cloud exchange 100, obtain customized analytics regarding competitor presence, cloud service presence/availability, and customer presence/availability, obtain usage statistics, and to manage content, for example. Support APIs 304D may be usable by customers or providers to manage accounts, perform automated billing/invoicing, validate credit, and configure profile and configuration information for the entity, for example.

In this example, orchestration engine 118 (illustrated as "interconnection orchestration engine 118") organizes, directs, and integrates microservices 308D and underlying software and network sub-systems 120 for managing various aspects of interconnection. For example, orchestration engine 118 may handle the entire quote-to-cash cycle for provisioning of interconnection assets by communicating with myriad interconnection enablement sub-systems 120, such as Customer Account and Profile Management Systems, Customer Asset Management Systems, Inventory Management Systems, Capacity Management Systems, Network Systems, Credit Management Systems, Content Management Systems, and Trouble Ticket Management System (not all shown in FIG. 2). To that end, orchestration engine 118 includes a workflow and rules engine 306 that responsively operates according to configured exchange policies 308A, profiles 308B, and configurations 308C to synthesize information and actions from sub-systems 120 to formulate intelligent next steps and responses to requests received via APIs 114.

Microservices component 308D componentizes many, and in some cases all, of the interconnection services to improve horizontal scalability, performance efficiency, and low-to-zero down-time feature upgrades and enhancements. In this way, orchestration engine 118 may abstract the complexity of underlying software and sub-systems 120 by providing a uniform, simplified and secured means to access the interconnection platform for accessing and managing interconnection assets.

Sub-systems 120 orchestrated by orchestration engine 118 in the example of FIG. 2 include identification (ID) and access management system 310A. In some examples, ID and access management system 310A includes a Permission Data Store (PDS) to house the customer, asset and permission hierarchy. ID and access management system 310A may accomplish federation using a third party system which generates Security Assertion Markup Language (SAML) assertions and is also capable of providing Single Sign-On (SSO) capability.

Orchestration engine 118 may orchestrate multiple order management systems 310B (e.g., for different geographic regions such as Asia Pacific, Europe, Middle East and Africa and North America). Orchestration engine 118 passes relevant virtual circuit order creation information to these order management systems 310B so that the partners can be billed. Orchestration engine 118 may abstract the complexity of the underlying network systems by seamlessly integrating with the network services system 310C to interact with the underlying network systems. Orchestration engine 118 may leverage an asset inventory and capacity management system 310D in conjunction with the Permission Data Store to obtain information about customer ports inventory. Orchestration engine 118 may leverage this information to place virtual circuit requests against the appropriate ports. Asset inventory and capacity management system 310D may be used to evaluate the available bandwidth on each port before provisioning of the virtual circuits.

Orchestration engine 118 accepts incident requests from partners and customers and communicates with the underlying incident management system 310E to raise service tickets. Orchestration engine 118 communicates with the content management system 310F to, e.g., render internationalized and localized content for a customer based on the language preference of the customer. Content management system 310F aids in transparent translation of all labels, error messages, success messages and responses displayed on the web portal, mobile devices or in machine-to-machine communication via APIs 114.

Figure 3A:
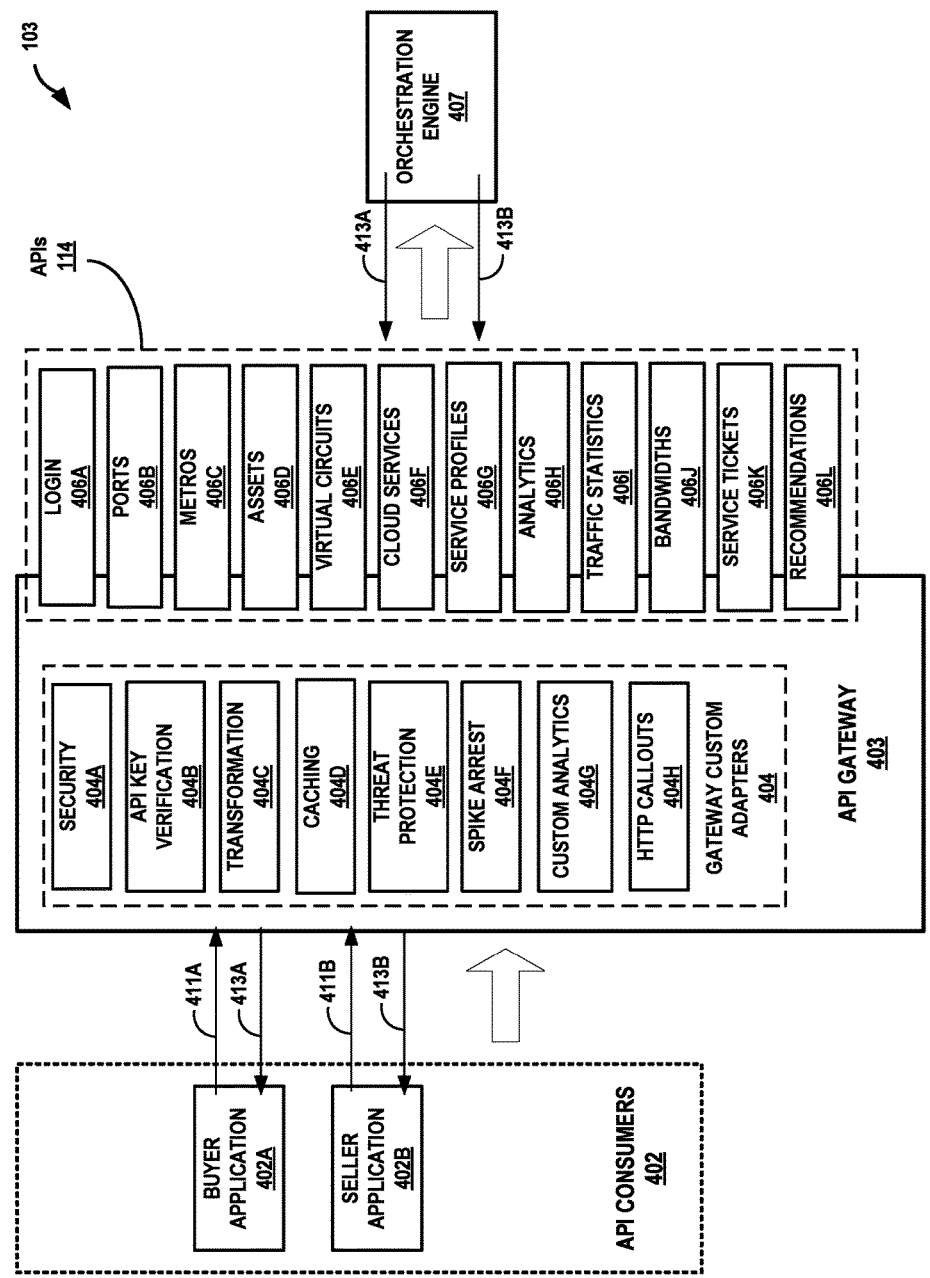
FIGS. 3A-3B depict a block diagram for interconnection platform components and software interfaces according to techniques described herein.
Figure 3B:
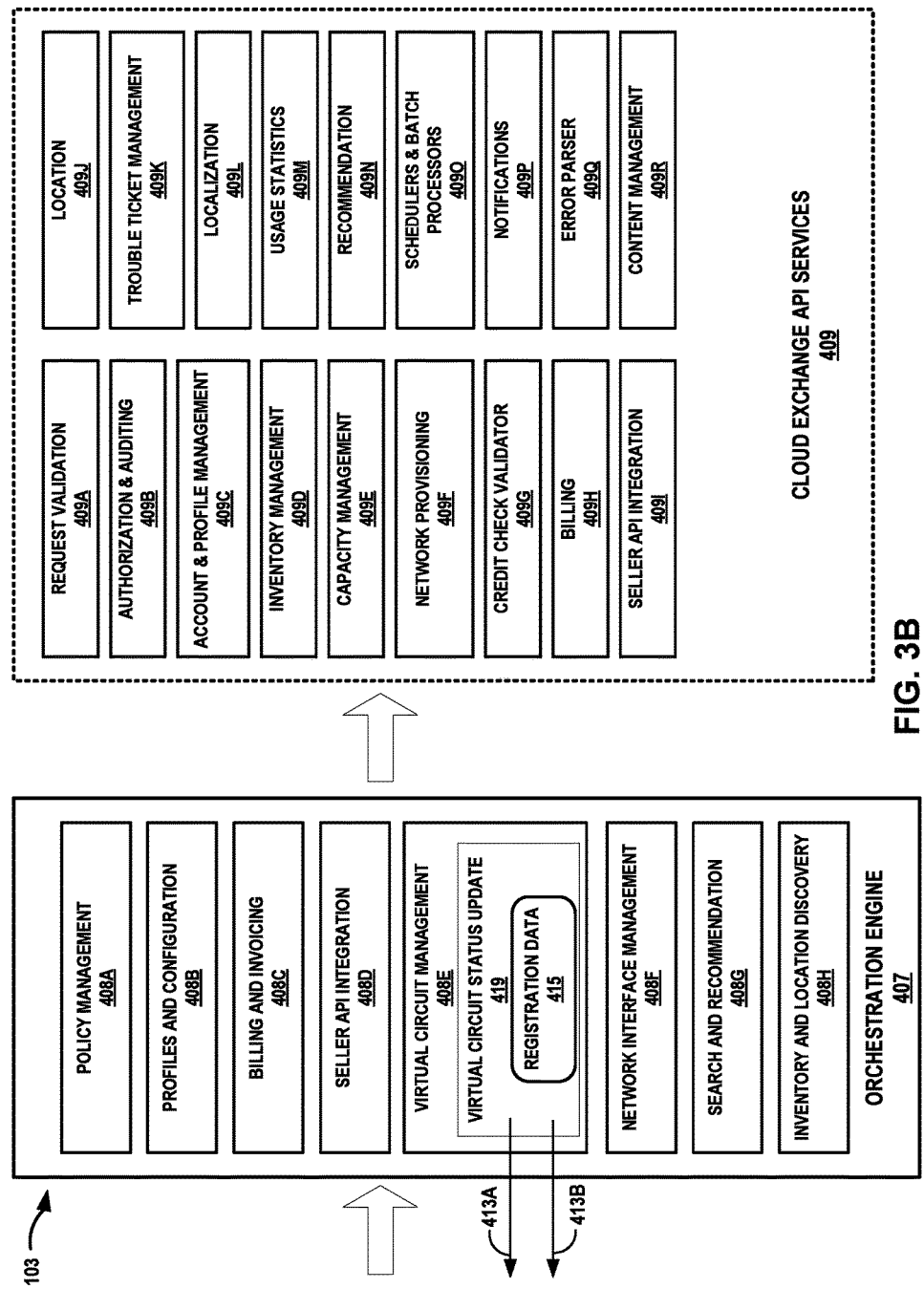

FIGS. 3A-3B depict a block diagram for interconnection software interfaces according to techniques described herein. In this example, API gateway 403 exposes APIs 114 having multiple endpoints 406A-406L (collectively, "endpoints 406") by which API consumers 402 may manage cloud exchange interconnections. API gateway 403, in turn, invokes the cloud service platform of orchestration engine 407, which orchestrates a workflow of service tasks represented in FIGS. 3A-3B by cloud exchange API services 409. API gateway 403 may represent an example instance of API gateway 112 of FIGS. 1A-1B, orchestration engine 407 may represent an example instance of orchestration gateway 118 of FIGS. 1A-1B, and sub-systems 120 of FIGS. 1A-2 may offer cloud exchange API services 409.

API consumers 402 may include buyer application 402A and seller application 402B. API gateway 403 may include a number of customer adaptors 404 that facilitate the operations of API gateway 403. Custom adaptors 404 include security 404A, API key verification 404B, transformation 404C, caching 404D, threat protection 404E, spike arrest 404F, custom analytics 404G, and HTTP callouts 404H.

Endpoints 406 represent available logical and/or physical resources accessible to API consumers 402. That is, API consumers 402 may access endpoints 406 to access the interconnection platform of a cloud exchange to get information regarding, create, modify, delete, and/or confirm requests for corresponding resources of the cloud exchange. Endpoints 406 may represent example instances of endpoints 116 of FIGS. 1A-1B.

In this example, endpoints 406 include login 406A, ports 406B, metros 406C, assets 406D, virtual circuits 406E, cloud services 406F, service profiles 406G, analytics 406H, traffic statistics 406I, bandwidths 406J, service tickets 406K, and recommendations 406L. In general, API consumers 406 may invoke any of endpoints 406 using a corresponding method and, in some cases, parameters that determine how the interconnection platform executes the method.

Endpoints 406 may represent different methods of a RESTful interface. API consumers 402 may invoke any of endpoints 406 using a communication protocol for transferring application data (e.g. HTTP) that specifies the method, a resource URI, and optionally parameters for the method. API gateway 403 translates the resource URI and the optional parameters for the endpoint 406 to cloud exchange platform-related constructs and invokes the cloud exchange platform of orchestration engine 407 according to one of a create, read, update, delete, or confirmation action corresponding to the endpoint 406 specified by the application data.

The following sections contain example details for selected endpoints 406 of APIs 114 for a cloud exchange 100. The API 114 provides functionality for allowing developers to access the interconnect platform for ordering and viewing virtual circuits. This API functionality includes getting information about and performing operations on Login 406A, Ports 406B, Virtual Circuits 406E, Metros 406C, and Cloud Services 406F.

In one example, endpoints 406 of APIs 114 may be categorized into three major categories:
  Foundational APIs—these APIs are common to both the buyer and the seller.
  Buyer APIs—These are the APIs that are used by the Enterprises, Network Service Providers (NSP) and Managed Service Providers (MSP) to establish connectivity to cloud services offered by the different Cloud Service Providers (CSPs).
  Seller APIs—These APIs are used by the CSPs to manage their cloud services at cloud exchange 100 and to enable buyers to connect to their services.

The APIs are broadly categorized into operations that can be performed on different resources. This section also details the common request headers that are required to be included as part of every request and also the response headers that are returned back with each API response. In addition, this section describes the HTTP status and custom error codes used as part of the API response in the event of any error condition.

The tables below show an overview of the API resources, their respective URIs, and supported operations on each resource. The APIs are divides in three major sections: Buyer, Seller, and Foundational APIs. Reference herein to XML refers to eXtensible Markup Language, while JSON refers to JavaScript Object Notation.

| Foundational API Overview | | |
|---|---|---|
| Resource | HTTP Operations | URI |
| Access Token | POST | POST/oauth2/v1/token |
| Metros | GET | GET/ecx/v1/metros |
| Cloud Services | GET | GET/ecx/v1/cloudservices GET/ecx/v1/cloudservices/{cloud_service_name} |
| Refresh token | POST | POST/oauth2/v1/refreshaccesstoken |

| Buyer API Overview | | |
|---|---|---|
| Resource | HTTP Operations | URI |
| Ports | GET | GET/ecx/v1/ports<br>GET/ecx/v1/ports/{port_name} |
| Virtual Circuits | GET, POST, DELETE, PATCH | GET/ecx/v1/virtualcircuits<br>POST/ecx/v1/virtualcircuits<br>GET/ecx/v1/virtualcircuits/{virtual_circuit_id}<br>DELETE/ecx/v1/virtualcircuits/{virtual_circuit_id}<br>PATCH/ecx/v1/virtualcircuits/{virtual_circuit_id} |
| User Assets | GET | GET//ecx/v1/assets |
| Seller Services | GET | GET ecx/v1/sellerservices,<br>GET ecx/v1/sellerservices/{seller_service_name} |
| Seller Service Profiles | GET | GET /ecx/v1/sellerserviceprofiles/{profile_name}/metadata |

| Seller API Overview | | |
|---|---|---|
| Resource | HTTP Operations | URI |
| Ports | GET | GET/ecx/v1/ports<br>GET/ecx/v1/ports/{port_name} |
| Virtual Circuits | GET, PATCH | GET/ecx/v1/virtualcircuits<br>PATCH/ecx/v1/virtualcircuits/{virtual_circuit_id}<br>GET/ecx/v1/virtualcircuits/{virtual_circuit_id} |
| User Assets | GET | GET/ecx/v1/virtualcircuits<br>PATCH/ecx/v1/virtualcircuits/{virtual_circuit_id}<br>GET/ecx/v1/virtualcircuits/{virtual_circuit_id} |
| Seller Service Profile | POST PUT, DELETE | POST/ecx/v1/sellerserviceprofiles<br>POST /ecx/v1/sellerserviceprofiles/{profile_name}/ports<br>PUT/ecx/v1/sellerserviceprofiles/{profile_name}<br>DELETE/ecx/v1/sellerserviceprofiles/{profile_name} |

HTTP Status Codes

The table below lists example HTTP status codes that can be utilized by APIs 114. There are specific error codes and messages which are returned back in error scenarios which are defined along with the appropriate API specification.

| HTTP Code | Description |
|---|---|
| 200 | OK |
| 201 | Created |
| 204 | No Content |
| 400 | Bad Request |
| 403 | Forbidden |
| 401 | Unauthorized |
| 404 | Not Found |
| 405 | Method not Allowed |
| 406 | Not Acceptable |
| 409 | Conflict |
| 415 | Unsupported Media Type |
| 500 | Internal Server Error |
| 503 | Service Unavailable |
| 504 | Gateway Timeout |

| Common Request Headers<br>The following headers are required in requests to all APIs. | | | |
|---|---|---|---|
| Header Attribute | Allowed Values | Required | Description |
| Content-Type | application/json<br>application/xml | Yes | The media type of the request body |
| Accept | application/json<br>application/xml | Yes | The media types acceptable for the response |

| Common Response Headers<br>The following header is included as part of all API responses | | | |
|---|---|---|---|
| Header Attribute | Allowed Values | Required | Description |
| Content-Type | application/json<br>application/xml | Yes | The content type passed in the response body |

Error Response Syntax

The error responses from all APIs follow the common syntax shown below.

```
{
"errors": [
{
"status": "string",
"code": "string",
"property": "string",
"message": "string",
"more_info": "string"
}]}
```

Error Response Message Fields

| errors | |
|---|---|
| Description | A list of errors |
| Type | List |
| Required | Yes |
| Default | None |
| Example | None |

| status | |
|---|---|
| Description | HTTP Status Code |
| Type | String |
| Required | Yes |
| Default | None | status

| | |
|---|---|
| Example | 409 | code

| | |
|---|---|
| Description | Internal ECX Error Code |
| Type | string |
| Required | Yes |
| Default | None |
| Example | 40902 | property

| | |
|---|---|
| Description | Attribute Name that has errors |
| Type | string |
| Required | No |
| Default | None |
| Example | vlan_id | message

| | |
|---|---|
| Description | Description of the error |
| Type | string |
| Default | None |
| Example | Duplicate VLAN id: A VLAN with the same value already exists for this port |
| Required | No | more_info

| | |
|---|---|
| Description | More information about the error on the portal. |
| Type | String |
| Default | None |
| Example | https://domain.com/docs/api/errors/4 |
| Required | No |

Sample Error Response:
Content-Type: application/json
{
  "errors": [
{
  "code": 40007,
  "message": "Invalid Field Value",
  "more_info": "The field value port_name already exists for the
  specified profile name",
  "property": "port_name",
  "status": 400
}
]
}

In some examples, users may be expected to generate API consumer Key and Consumer Secret using a platform before invoking the APIs.

Authentication

Application acquires an access token through a valid login before invoking any APIs 114.

Foundational APIs

Resource: Access Token or Login 406A.

Description: OAuth2.0 token for accessing APIs 114.

| HTTP Method | Request URI |
|---|---|
| POST | /oauth2/v1/token |

POST Access Token

Description: This API handles authentication and authorization of the requesting system. Upon successful authentication an access token is returned as part of the response. An error message is returned on unsuccessful attempts.

Request

Request URI: POST http://<HostName>/ecx/v1/oauth/token

Filter Parameters:

None

Request Headers:

None

Request Fields:

grant_type

| | |
|---|---|
| Description | OAuth grant operation. Acceptable value: password |
| Type | String |
| Required | Yes |
| Default | None |
| Example | client_credentials | user_name

| | |
|---|---|
| Description | User name for login |
| Type | string |
| Required | Yes |
| Default | None |
| Example | tempuser1 | user_password

| | |
|---|---|
| Description | Password for login |
| Type | string |
| Required | Yes |
| Default | None |
| Example | xxxxxxx | client_id

| | |
|---|---|
| Description | API Consumer Key |
| Type | string |
| Required | Yes |
| Default | None |
| Example | QWERTY1234567afgaaaa |

| password_encoding | |
|---|---|
| Description | Password encoding used.<br>If this field is not present the password is considered to be in plain text format.<br>Password Encryption: Following encryption modes are supported:<br>None<br>Password sent as plaintext.<br>md5-b64<br>The password is encoded using MD5/Base64 encoding. MD5 digest has to be generated in byte format (not MD5 hex digest) and then encoded into base64 (Recommended)<br>b64<br>The password is encoded using Base64 |
| Type | string |
| Default | None |
| Required | No |
| Example | md5-b64 |

Sample Requests
POST http://<HostName>/ecx/v2/oauth/token
Password as plain text:
{
  "grant_type":"client_credentials",
  "user_name": "tempuser1",
  "user_password": "xxxxxxx",
  "client_id": "QWERTY1234567abcdefg",
  "client_secret": "tstCLNT123scrt"
}
Password encoded with md5 and then b64:
{
  "grant_type":"password",
  "user_name": "tempuser1",
  "user_password": "xxxxxxxxxxxx",
  "client_id": "QWERTY1234567abcdefg",
  "client_secret": "tstCLNT123scrt",
  "password_encoding": "md5-b64"
}
Response:
Response Fields:

| access_token | |
|---|---|
| Description | The access token that must be passed in the HTTP header to access all APIs |
| Type | string |
| Required | Yes |
| Default | None |
| Example | HihiOtaY2JAT0QaTFaYYyzHOqqmb |

| token_timeout | |
|---|---|
| Description | Timeout for the access token in seconds |
| Type | string |
| Required | Yes |
| Default | None |
| Example | 3599 |

| user_name | |
|---|---|
| Description | User Name |
| Type | string |
| Required | Yes |

| user_name | |
|---|---|
| Default | None |
| Example | username |

| token_type | |
|---|---|
| Description | Type of access token |
| Type | string |
| Required | Yes |
| Default | Bearer |
| Example | Bearer |

| refresh_token | |
|---|---|
| Description | Refresh token that can be used for obtaining a new access token |
| Type | string |
| Required | No |
| Default | None |
| Example | QvJdZg7nMSTNYBfeDLgECpe5b9FvgWgdpZRwv4u0nZ |

| refresh_token_timeout | |
|---|---|
| Description | Timeout for the refresh token in seconds |
| Type | string |
| Required | No |
| Default | None |
| Example | 86376 |

Sample Response:
HTTP/1.1 200 OK
API-Version: v1
Content-Type: application/json
Accept: application/json
{
  "access_token": "HihiOtaY2JAT0QaTFaYYyzHOqqmb",
  "token_timeout": "3599",
  "user_name": "tempuser1",
  "token_type": "Bearer",
  "refresh_token": "QvJdZg7nMSTNYBfeDLgECpe5b9FvgWgdpZRwv-4u0nZ",
  "refresh_token_timeout": "86376"
}
Error Code in Response:

| HTTP Code | Error Code | Error Description |
|---|---|---|
| 400 | 40010 | Invalid value for grant type. The acceptable value is "password" |
| 401 | 40101 | Authentication failed. Invalid username or password |
| 401 | 40103 | Invalid API Key |
| 406 | | Not Acceptable |
| 415 | | Unsupported Media Type |
| 500 | | Internal Server Error |

POST Refresh Token: Description: This API allows developer to refresh existing OAuth Token issued which will expire otherwise within 60 minutes. A valid refresh token is needed to retrieve a new successful authentication access_token that will be returned as part of the response.

Request
Request URI: POST http://<HostName>/oauth2/v1/refreshaccesstoken
Filter Parameters: None
Request Headers: None
Request Fields:

grant_type

| | |
|---|---|
| Description | OAuth grant operation. Acceptable values: refresh_token. |
| Type | String |
| Required | Yes |
| Default | None |
| Example | Password | client_id

| | |
|---|---|
| Description | API Consumer Key |
| Type | String |
| Required | Yes |
| Default | None |
| Example | QWERTY1234567afgaaaa | refresh_token

| | |
|---|---|
| Description | Refresh token that can be used for obtaining a new access token |
| Type | string |
| Required | YES |
| Default | None |
| Example | 5f752714hsdf07a3e41c2a3311f514e1 |

Sample Requests
POST http://<HostName>/oauth2/v1/refreshaccesstoken
Refresh Token
{
  "grant_type":"refresh_token",
  "client_id": "QWERTY1234567abcdefg",
  "client_secret": "tstCLNT123scrt",
  "refresh_token": "5f752714hsdf07a3e41c2a3311f514e1"
}
Response:
Response Fields:

access_token

| | |
|---|---|
| Description | The access token that must be passed in the HTTP header to access all API's |
| Type | string |
| Required | Yes |
| Default | None |
| Example | HihiOtaY2JAT0QaTFaYYyzHOqqmb | token_timeout

| | |
|---|---|
| Description | Timeout for the access token in seconds |
| Type | string |
| Required | Yes |
| Default | None |
| Example | 3599 (1hr) | user_name

| | |
|---|---|
| Description | User Name |
| Type | string |
| Required | Yes |
| Default | None |
| Example | Username "adrew" | token_type

| | |
|---|---|
| Description | Type of access token |
| Type | string |
| Required | Yes |
| Default | Bearer |
| Example | Bearer | refresh_token

| | |
|---|---|
| Description | Refresh token that can be used for obtaining a new access token |
| Type | string |
| Required | No |
| Default | None |
| Example | QvJdZg7nMSTNYBfeDLgECpe5b9FvgWgdpZRwv4u0nZ | refresh_token_timeout

| | |
|---|---|
| Description | Timeout for the refresh token in seconds |
| Type | string |
| Required | No |
| Default | None |
| Example | 86376 |

Buyer APIs

Resource: Virtual Circuits

The Virtual Circuits resource for buyer application 402A is accessible by virtual circuits 406E of APIs 114. Buyer application 402A may create, modify, delete, and obtain information regarding a status of a virtual circuit by sending a request to the virtual circuits 406E endpoint. In some examples, the virtual circuits 406E endpoint conforms to the following specification:

| HTTP Method | Request URI |
|---|---|
| GET | /ecx/v1/virtualcircuits |
| | /ecx/v1/virtualcircuits/{virtual_circuit_id} |
| POST | /ecx/v1/virtualcircuits |

GET Virtual Circuits:

Description: This implementation of the GET operation returns a list of all virtual circuits owned by the authenticated sender of the request. If the sender has no virtual circuits, a response with HTTP Code 204 is returned with no payload.

Request

Request Headers:

| Header Attribute | Description |
|---|---|
| Authorization | Required. Specify the Oauth Bearer token |

Request URI: /ecx/v1/virtualcircuits
Filter Parameters—None
Request Fields—None
Sample Request
GET http://<HostName>/ecx/v1/virtualcircuits/{virtual_circuit_id}
Response
Response Fields id

| | |
|---|---|
| Description | Virtual Circuit ID |
| Type | string |
| Required | Yes |
| Default | None |
| Example | 4D34239266A3952695956A | redundant_id

| | |
|---|---|
| Description | Virtual circuit ID associated with the redundant virtual circuit |
| Type | string |
| Required | Yes |
| Default | None |
| Example | 4D34239266A3952695956B | name

| | |
|---|---|
| Description | Name of the virtual circuit |
| Type | string |
| Required | Yes |
| Default | None |
| Example | Steve CSP_A Test VC-7 | buyer__port

| | |
|---|---|
| Description | Buyer side port name |
| Type | string |
| Required | Yes |
| Default | None |
| Example | "GSE_QA-R-EE-01 | cross_connect_id

| | |
|---|---|
| Description | Id of the physical port |
| Type | string |
| Required | yes |
| Default | None |
| Example | 11111111 | port_speed

| | |
|---|---|
| Description | The capacity of the port, e.g., 1 G |
| Type | string |
| Required | yes |
| Default | None |
| Example | 1 G | cloud_service_name

| | |
|---|---|
| Description | Cloud Service Name |
| Type | string |
| Required | Yes |
| Default | None |
| Example | CSP_A_1 | service_key

| | |
|---|---|
| Description | Service Key obtained from the Cloud Service |
| Type | string |
| Required | yes |
| Default | None |
| Example | xxxxxxxx-xxxx-xxxx-xxxx-xxxxxxxxxxxx | buyer_vlan

| | |
|---|---|
| Description | Buyer side VLAN Id |
| Type | string |
| Required | yes |
| Default | None |
| Example | 2004.* | bandwidth

| | |
|---|---|
| Description | Bandwidth |
| Type | string |
| Required | Yes |
| Default | None |
| Example | 200 MB | status

| | |
|---|---|
| Description | State of the virtual circuit. Example possible values are "Being Provisioned", "Ordering", "Pending", "Available", "Not Provisioned", "Provisioned", "Pending Add", "Deleted" and "Pending Delete." |
| Type | string |
| Default | None |
| Example | PROVISIONED |
| Required | No |

| created_date | |
|---|---|
| Description | Date the virtual circuit is created |
| Type | string |
| Required | Yes |
| Default | None |
| Example | 05/23/2014 01:21:54 |

| created_by | |
|---|---|
| Description | The user who created the virtual circuit |
| Type | string |
| Required | yes |
| Default | None |
| Example | tempuser1 |

| email | |
|---|---|
| Description | Email of the user |
| Type | string |
| Required | Yes |
| Default | None |
| Example | test@cloudexchange.com |

| seller_port | |
|---|---|
| Description | Seller side port |
| Type | string |
| Required | yes |
| Default | None |
| Example | GSE_QA-SJC-port-CIS-2-SEC-A |

| metro_code | |
|---|---|
| Description | Code of the metro in which this Virtual Circuit is located |
| Type | string |
| Required | Yes |
| Default | None |
| Example | SV |

| ibx_name | |
|---|---|
| Description | Name of the metro in which this Virtual Circuit is located |
| Type | string |
| Required | Yes |
| Default | None |
| Example | SV1 |

| seller_service_name | |
|---|---|
| Description | Name of the seller service profile for the virtual circuit |
| Type | string |
| Required | No |
| Default | None |
| Example | Direct Connect |

| metadata | |
|---|---|
| Description | This object can be used by users to enter metadata information about their VCs. This is not a mandatory object of fields. If the buyer passed metadata information during VC creation, the buyer can retrieve this metadata information during GET Virtual Circuit operation. Only 5 key-value pairs can be passed in this metadata object. For particular sellers, the metadata object shall be null. |
| Type | object |
| Required | No |
| Default | None |
| Example | None |

| "key:value" | |
|---|---|
| Description | The key and associated value that the API user can pass in the metadata object. |
| Type | string |
| Required | No |
| Default | None |
| Example | None |

Sample Response:
HTTP/1.1 200 OK
Content-Type: application/json
```
{
  "virtualcircuits": [
  {
    "id": "4D34239266A3952695956A",
    "name": "Sample Test VC-7",
    "buyer_port": "GSE_QA-R-EE-01",
    "cross_connect_id": "14395166",
    "port_speed": "1G",
    "cloud_service_name": "CSP_A_1",
    "service_key":         "XXXXXXXX-XXXX-XXXX-XXXX-XXXXXXXXXXXX",
    "buyer_vlan": "2004.*",
    "bandwidth": "Up to 200 MB",
    "status": "BILLED",
    "created_date": "05/23/2014 01:21:54",
    "created_by": "testuser1",
    "email": "test@cloudexchange.com",
    "seller_port":    "GSE_QA-SJC-06GMR-CIS-2-SEC-A",
    "metro_code": "SV",
    "ibx_name": "SV1",
    "seller_service_name": "cspereatetest",
"metadata": {
"key1": "value1",
"key2": "value2",
```

```
"key3": "value3",
"key4": "value4",
"key5": "value5"
    },
    {
        "id": "1432",
        "name": "Steve CSP_A Test VC-5",
        "buyer_port": "GSE_QA-R-EE-01",
        "cross_connect_id": "14395166",
        "port_speed": "1G",
        "cloud_service_name": "CSP_A_1",
        "service_key":          "xxxxxxxx-xxxx-xxxx-xxxx-
            xxxxxxxxxxxx",
        "buyer_vlan": "2004.*",
        "bandwidth": "Up to 200 MB",
        "status": "BILLED",
        "created_date": "05/23/2014 01:21:54",
        "created_by": "testuser1",
        "email": "test@cloudexchange.com",
        "seller_port": "GSE_QA-SJC-1234-CIS-2-SEC-A",
        "metro_code": "SV",
        "ibx_name": "SV1"
    }
  ]
}
```

The above example response for virtual circuits 406E may be responsive to a request issued by buyer application 402A.

Error Code in Response:

| HTTP Status Code | Error Code | Error Description |
|---|---|---|
| 401 | 40102 | Token Expired, Login again |
| 401 | 40104 | Invalid Access Token |
| 401 | 40105 | User doesn't have sufficient privilege to perform the operation |
| 406 | | Not Acceptable |
| 415 | | Unsupported Media Type |
| 500 | | Internal Server Error |

POST Virtual Circuits:
Description: Create Virtual Circuit.
Request

Request Headers:

| Header Attribute | Description |
|---|---|
| Authorization | Required. Specify the Oauth Bearer token |

Request URI: POST http://<hostname>/ecx/v1/virtualcircuits
Filter Parameters
None
Request Fields metro_name

| | |
|---|---|
| Description | Name of the metro in which this Virtual Circuit is located |
| Type | string |
| Required | Yes | metro_name (-continued)

| | |
|---|---|
| Description | Name of the metro in which this Virtual Circuit is located |
| Default | None |
| Example | Silicon Valley | metro_code

| | |
|---|---|
| Description | Code of the metro in which this Virtual Circuit is located |
| Type | string |
| Required | Yes |
| Default | None |
| Example | SV | cloud_service_name

| | |
|---|---|
| Description | Name of the Cloud Service Profile. Depending on the cloud service selected the fields required in the payload will differ. |
| Type | string |
| Required | Yes |
| Default | None |
| Example | CSP_A_1 | seller_service_name

| | |
|---|---|
| Description | Name of the Seller Service Profile. Depending on the seller service selected the fields required in the payload will differ. |
| Type | string |
| Required | Yes |
| Default | None |
| Example | Name provided by seller service provider | primary_vc_name

| | |
|---|---|
| Description | Primary virtual circuit name |
| Type | string |
| Required | Yes |
| Default | None |
| Example | twtca93 | primary_port_name

| | |
|---|---|
| Description | Primary buyer Port name |
| Type | string |
| Required | Yes |
| Default | None |
| Example | GSE_QA-SJC-06GMR-CIS-2-SEC-A |

| secondary_vc_name | |
|---|---|
| Description | Secondary virtual circuit name |
| Type | String |
| Required | No |
| Default | None |
| Example | twtca94 |

| secondary_port_name | |
|---|---|
| Description | Secondary buyer port name |
| Type | string |
| Required | No |
| Default | None |
| Example | GSE_QA-SJC-06GMR-CIS-2-SEC-A |

| secondary_vlan_id | |
|---|---|
| Description | Secondary buyer VLAN Id |
| Type | string |
| Required | No |
| Default | None |
| Example | 188 |

| service_key | |
|---|---|
| Description | Service Key obtained from the Cloud Service |
| Type | string |
| Required | Yes |
| Default | None |
| Example | xxxxxxxx-xxxx-xxxx-xxxx-xxxxxxxxxxxx |

| virtual_circuit_speed | |
|---|---|
| Description | Speed of the virtual circuit |
| Type | string |
| Required | Yes |
| Default | None |
| Example | 200 MB |

| email | |
|---|---|
| Description | Email of the user |
| Type | string |
| Required | No |
| Default | None |
| Example | test@cloudexchange.com |

Sample Request
POST http://<HostName>/ecx/v1/virtualcircuits
Authorization: Bearer <accessToken>
Accept: application/xml or application/json
{
　"metro_name":"Silicon Valley",
　"metro_code":"SV",
　"cloud_service_name":"CSP_A_1",
　"primary_vc_name":"twtca93",
　"primary_port_name":"GSE_QA-SJC-06GMR-CIS-2-SEC-A",
　"primary_vlan_id":"188",
　"secondary_vc_name":"twtcp94",
　"secondary_port_name":"GSE_QA-SJC-06GMR-CIS-2-SEC-B",
　"secondary_vlan_id":"188",
　"service_key":"xxxxxxxx-xxxx-xxxx-xxxx-xxxxxxxxxxxx",
　"virtual_circuit_speed":"Up to 200 MB",
　"email":test@cloudexchange.com
　"metadata"
}
Response
Response Fields:

| result | |
|---|---|
| Description | Result of the operation indicating whether it was successful. Valid values are SUCCESS and ERROR |
| Type | string |
| Required | Yes |
| Default | None |
| Example | SUCCESS |

| message | |
|---|---|
| Description | Success Message |
| Type | string |
| Required | Yes |
| Default | None |
| Example | Your Virtual Circuit request was successful |

Other example fields may include "more info," primary virtual circuit id, secondary virtual circuit id.

Sample Response:
HTTP/1.1 201 CREATED
Location: 4D34239266A3952695956A
{
　"result": "SUCCESS"
　"message": "Your Virtual Circuit request was successful."
　"more_info": "https://domain.com/docs/api/messages/xx"
}

Error Code in Response:

| HTTP Status Code | Error Code | Error Description |
|---|---|---|
| 400 | 40002 | The value of VLAN should be between 1 and 4095 |
| 400 | 40003 | Cannot select the same port for Primary and Secondary Virtual Circuit |
| 400 | 40004 | Enter a value for all required fields |
| 400 | 40005 | The number of characters exceeded |
| 400 | 40006 | Cannot select the same name for Primary and Secondary Virtual Circuit |
| 400 | 40007 | Invalid Field Value |
| 400 | 40009 | Application specific error. Ex., duplicate VLAN Id |
| 401 | 40102 | Token Expired. Login again |

Error Code in Response:

| HTTP Status Code | Error Code | Error Description |
|---|---|---|
| 401 | 40104 | Invalid Access Token |
| 401 | 40105 | User doesn't have sufficient privilege to perform the operation |
| 415 | | Unsupported Media Type |
| 500 | | Internal Server Error |

In some examples, APIs may be provided for deleting virtual circuits. The DELETE operation will remove the virtual circuit provided, a response with HTTP Code 200 is returned if operation is successful. If the virtual circuit belongs to certain seller service providers, the seller service providers may confirm the deletion of the virtual circuit.
Sample Request
DELETE http://<HostName>/ecx/v1/virtualcircuits/{virtual_circuit_id}
Sample Response:
HTTP/1.1 200 DELETED
{
  "result": "SUCCESS"
  "message": "Your Virtual Circuit has been deleted successfully."
  "more_info": " "
}

In some examples, APIs may be provided for PATCH enable connection. This implementation of the PATCH operation lets the users enable a virtual circuit if the seller requires additional step of authentication before enabling the buyer connection request.
Sample Response:
HTTP/1.1 201 CREATED
{
  "result": "SUCCESS",
  "message": "Connection enabling request successful"
  "more_info": " "
}

In some examples, APIs are provided for Seller Service Profiles to be created by sellers in Cloud Exchange. Cloud Exchange sellers are required to define and set up their service profiles for connectivity to their seller services. Sellers can create a profile for each discrete service that they offer.

In some examples, a "GET virtual circuit payload metadata" implementation of the GET operation returns the payload metadata required to create virtual circuits for a given seller service profile.
Sample Request
GET http://<HostName>/ecx/v1/sellerserviceprofiles/CloudSigma Profile/metadata
Sample Response:
HTTP/1.1 200 OK
Content-Type: application/json
{
"fields": [
{
  "description": "Code of the metro in which this virtual circuit will be created",
  "name": "metro_code",
  "type": "string"
},
{
  "description": "Seller Service Name",
  "name": "seller_service_name",
  "type": "string"
},
{
  "description": "Primary virtual circuit name",
  "name": "primary_vc_name",
  "type": "string"
},
{
  "description": "Buyers primary port name",
  "name": "primary_port_name",
  "type": "string"
},
{
  "description": "Buyers primary VLAN Id",
  "name": "primary_vlan_id",
  "type": "string"
},
{
  "description": "Secondary virtual circuit name",
  "name": "secondary_vc_name",
  "type": "string"
},
{
  "description": "Buyers secondary port name",
  "name": "secondary_buyer_port_name",
  "type": "string"
},
{
  "description": "Buyers secondary VLAN Id",
  "name": "secondary_buyer_vlan_id",
  "type": "string"
},
{
  "description": "Service Key or Digital Authorization Key obtained from CSP",
  "name": "service_key",
  "type": "string"
},
{
  "description": "Speed of the virtual circuit",
  "name": "virtual_circuit_speed",
  "type": "string"
},
{
  "description": "Email of the user",
  "name": "email",
  "type": "string"
}
]
}

Seller APIs
Resource: Virtual Circuits
The Virtual Circuits resource for seller application 402B is accessible by virtual circuits 406E of APIs 114. Seller application 402B may create, modify, delete, and obtain information regarding a status of a virtual circuit by sending a request to the virtual circuits 406E endpoint. In some examples, the virtual circuits 406E endpoint conforms to the following specification:

| | |
|---|---|
| Description: Virtual Circuits | |
| HTTP Method | Request URI |
| GET | /ecx/v1/virtualcircuits |
|  | /ecx/v1/virtualcircuits/{virtual_circuit_id} |
| POST | /ecx/v1/virtualcircuits |

GET Virtual Circuits:

Description: This implementation of the GET operation returns a list of virtual circuits owned by the user. The virtual circuits can be filtered based on their status. If no virtual circuits are found matching the criteria, a response with HTTP Code 204 is returned with no payload.

Request

Request URI(s):

GET http://<HostName>/ecx/v1/virtualcircuits?pending=add

Filter Parameters:

pending

| | |
|---|---|
| Description: Status of the virtual circuits. Possible values are | |
| add - to get all the virtual circuits that are created by a buyer but not yet accepted by the seller | |
| delete - to get all the virtual circuits that are deleted by a buyer but not yet accepted by the seller | |
| Type | string |
| Required | No |
| Default | None |
| Example | add |

| | |
|---|---|
| Request Headers: | |
| Header Attribute | Description |
| Authorization | Required. Specify the OAuth Bearer token |

Request Fields:

None

Sample Request:

GET http://<HostName>/ecx/v1/virtualcircuits?pending=add

Response

Response Fields

| | |
|---|---|
| id | |
| Description | Virtual circuit ID |
| Type | string |
| Required | Yes |
| Default | None |
| Example | 4D34239266A3952695956A |

| | |
|---|---|
| name | |
| Description | Name of the virtual circuit |
| Type | string |
| Required | Yes |
| Default | None |
| Example | Steve CSP_A Test VC-7 |

| | |
|---|---|
| buyer_port | |
| Description | buyer side port id |
| Type | string |
| Required | Yes |
| Default | None |
| Example | "GSE_QA-R-EE-01" |

| | |
|---|---|
| cross_connect_id | |
| Description | Id of the physical port |
| Type | string |
| Required | Yes |
| Default | None |
| Example | 11111111 |

| | |
|---|---|
| port_speed | |
| Description | The capacity of the port eg: 1G or 10G |
| Type | string |
| Required | Yes |
| Default | None |
| Example | 1G |

| | |
|---|---|
| cloud_service_name | |
| Description | Cloud Service Name |
| Type | string |
| Required | Yes |
| Default | None |
| Example | CSP_A_1 |

| | |
|---|---|
| service_key | |
| Description | Service Key obtained from the Cloud Service |
| Type | string |
| Required | Yes |
| Default | None |
| Example | xxxxxxxx-xxxx-xxxx-xxxx-xxxxxxxxxxxx |

| | |
|---|---|
| buyer_vlan | |
| Description | Buyer side VLAN Id |
| Type | string |
| Required | Yes |
| Default | None |
| Example | 2004.* |

| | |
|---|---|
| bandwidth | |
| Description | Bandwidth |
| Type | string |
| Required | Yes |

| bandwidth | |
|---|---|
| Description | Bandwidth |
| Default | None |
| Example | 200 MB |

| status | |
|---|---|
| Description | Status of the virtual circuit |
| Type | string |
| Required | No |
| Default | None |
| Example | BILLED |

| created_date | |
|---|---|
| Description | Date the virtual circuit is created |
| Type | string |
| Required | Yes |
| Default | None |
| Example | 05/23/2014 01:21:54 |

| created_by | |
|---|---|
| Description | The user who created the virtual circuit |
| Type | string |
| Required | Yes |
| Default | None |
| Example | tempuser1 |

| email | |
|---|---|
| Description | Email of the user |
| Type | string |
| Required | Yes |
| Default | None |
| Example | test@cloudexchange.com |

| seller_port | |
|---|---|
| Description | Seller port |
| Type | string |
| Required | No |
| Default | None |
| Example | GSE_QA-SJC-06GMR-CIS-2-SEC-A |

| metro_code | |
|---|---|
| Description | Code of the metro in which this Virtual Circuit is located. |
| Type | string |
| Required | Yes |
| Default | None |
| Example | SV |

| ibx_name | |
|---|---|
| Description | Name of the IBX in which this Virtual Circuit is located |
| Type | string |
| Required | Yes |
| Default | None |
| Example | SV1 |

Other example fields such as those included above in other examples may be used.

Sample Response:
HTTP/1.1 200 OK
Content-Type: application/json
{
 "virtualcircuits": [
 {
  "id": "4D34239266A3952695956A",
  "name": "Test Virtual Circuit",
  "buyer_port": "GSE_QA-R-EE-01",
  "cross_connect_id": "11111111",
  "port_speed": "1G",
  "cloud_service_name": "CSP_A_1",
  "service_key": "xxxxxxxx-xxxx-xxxx-xxxx-xxxxxxxxxxxx",
  "buyer_vlan": "2004.*",
  "bandwidth": "Up to 200 MB",
  "status": "BILLED",
  "created_date": "05/23/2014 01:21:54",
  "created_by": "temp user",
  "email": "test@cloudexchange.com",
  "seller_port": "sellerport",
  "metro_code": "SV",
  "ibx_name": "SV1"
 }]}

| Error Code in Response: | | |
|---|---|---|
| HTTP Status Code | Error Code | Error Description |
| 400 | 40001 | Invalid Parameter Value |
| 401 | 40102 | Token Expired, need to login again |
| 401 | 40104 | Invalid Access Token |
| 401 | 40105 | User doesn't have sufficient privilege to perform the operation |
| 406 | | Not Acceptable |
| 415 | | Unsupported Media Type |
| 500 | | Internal Server Error |

PATCH Virtual Circuit:

Description: The PATCH operation can be used to perform the following three types of operations on a virtual circuit by the seller:

Accept a Virtual Circuit created by a buyer

Reject a Virtual Circuit created by a buyer

Confirm the deletion of the Virtual Circuit by a buyer

Request

Request URI(s):

PATCH http://<HostName>/ecx/v1/virtualcircuits/{virtual_circuit_id}

| Request Headers: | |
| --- | --- |
| Header Attribute | Description |
| Authorization | Required. Specify the Oauth Bearer token |

Request Fields:

| action | |
| --- | --- |
| Description | Action on the resource. Valid values are |
| | approve |
| | Approve a virtual circuit created by a buyer |
| | reject |
| | Create a virtual circuit created by a buyer |
| | confirm_delete |
| | Confirm the deletion of the Virtual Circuit by a buyer |
| | available |
| | Update the status of Virtual Circuit is available after approval |
| | not_available |
| | Update the status of Virtual Circuit to not available. |
| Type | string |
| Required | Yes |
| Default | None |
| Example | approve |

| port_name | |
| --- | --- |
| Description | Seller side Port Name |
| Type | string |
| Required | Yes |
| Default | None |
| Example | GSE_QA-SJC-06GMR-CIS-2-SEC-A |

| vlan_id | |
| --- | --- |
| Description | Seller side VLAN Id |
| Type | string |
| Required | Yes |
| Default | None |
| Example | xxxx-xxxxxx | redundant_vlan_id
reject_comment—seller side comment to explain the rejection of the virtual circuit
Sample Request
PATCH  http://<hostname>/ecx/vc2/virtualcircuit/4D34239266A3952695956A
{
  "action": "approve",
  "port_name": "GSE_QA-SJC-06GMR-CIS-2-SEC-A",
  "vlan_id": "188"
}
Response:
Response Fields:

| result | |
| --- | --- |
| Description | Result of the Operation indication whether it was successful. Valid values are SUCCESS and ERROR |
| Type | string |
| Required | Yes |
| Default | None |
| Example | SUCCESS |

Sample Response:
HTTP/1.1 200 OK
{
  "result": "SUCCESS",
  "message": "The requested virtual circuit has been rejected and the buyer has been notified.",
  "more_info": "https://domain.com/docs/api/messages/vcs/2"
}

| Error Code in Response: | | |
| --- | --- | --- |
| HTTP Status Code | Error Code | Error Description |
| 400 | 40002 | The value of VLAN should be between 1 and 4095 |
| 400 | 40004 | Enter a value for all required fields |
| 400 | 40007 | Invalid Field Value |
| 400 | 40008 | Virtual Circuit cannot be deleted by seller as it is not deleted by the buyer |
| 400 | 40009 | Application specific error. Ex., duplicate VLAN ID |
| 401 | 40101 | Authentication failed |
| 401 | 40102 | Token Expired, Login again |
| 401 | 40104 | Invalid Access Token |
| 401 | 40105 | User doesn't have sufficient privilege to perform the operation |
| 406 | | Not Acceptable |
| 415 | | Unsupported Media Type |
| 500 | | Internal Server Error |

| All Error Codes | | |
| --- | --- | --- |
| HTTP Status Code | Error Code | Error Description |
| 400 | 40001 | Invalid Parameter Value |
| 400 | 40002 | The value of VLAN should be between 1 and 4095 |
| 400 | 40003 | Cannot select the same port for Primary and Secondary Service |
| 400 | 40004 | Enter a value for all required fields |
| 400 | 40005 | The number of characters exceeded |
| 400 | 40006 | Cannot select the same name for Primary and Secondary Virtual Circuit |
| 400 | 40007 | Invalid Field Value |
| 400 | 40008 | Virtual Circuit cannot be deleted by seller as it is not deleted by the buyer |
| 400 | 40009 | Application specific error. Ex., duplicate VLAN Id |
| 400 | 40010 | Invalid value for grant_type. The acceptable value is "password". |
| 401 | 40101 | Authentication Failed. Invalid Username or Password. |
| 401 | 40102 | Token Expired. Login again. |
| 401 | 40103 | Invalid API Key |
| 401 | 40104 | Invalid Access Token |
| 401 | 40105 | User doesn't have sufficient privilege to perform the operation |
| 404 | | Not Found |
| 405 | | Method not Allowed |
| 406 | | Not Acceptable |
| 415 | | Unsupported Media Type |
| 500 | | Internal Server Error |
| 503 | | Service Unavailable |
| 504 | | Gateway Timeout |

Other endpoints 406 may have request/response schemes similar to those provided above for Login 406A, Ports 406B, Metros 406C, Virtual Circuits 406E, and Cloud Services 406F.

Login 406A enables a secure channel for access to interconnection assets by authenticated and authorized partners and customers. Moreover, the interconnection platform provides out-of-the-box capability to address security issues (threat protection, SQL Injection protection, DDoS attack prevention, JSON bomb protection, etc.). In some examples, an entity uses its credentials (e.g., username, password, API key, and/or API secret) to obtain a security token (e.g., an OAuth 2.0 token) using Login 406A, the security token thereafter ensuring that requests issued by the now-authorized entity to other endpoints 406 are from an authorized customer or partner.

API gateway 403, in some examples, transforms application data formatted according to a request to any of endpoints 406 and uses the transformed application data to make calls to orchestration engine 407. Orchestration engine 407 may executed by one or more real servers and/or virtual machines configured to implement the cloud exchange platform services 408A-408H (collectively, "platform services 408") in this example. In response to invocation by API gateway 403, a workflow and rules engine (not shown in FIG. 3B) of orchestration engine 407 may apply defined rules and policies to generate a workflow of cloud exchange API services 409 that, in general, fit within an overall function associated with one of platform services 408. As illustrated, the platform services 408 include policy management 408A, profiles and configuration 408B, billing and invoicing 408C, seller API integration 408D, virtual circuit management 408E, network interface management 408F, search and recommendation 408G, and inventory and location discovery 408H. Each of platform services may represent a workflow and rules engine for a different aspect of cloud service provisioning.

Cloud exchange API services 409A-409R (collectively, "cloud exchange services 409") represent services offered by the interconnection platform to modify the cloud exchange network infrastructure, manage content, manage incidents, manage inventory and capacity, ensure secured access, and manage orders/billing for providers and customers, as examples. Any of cloud exchange services 409 may itself represent a bundle of microservices for request/response transactions invokable by orchestration engine 407 managing a workflow.

Cloud exchange services 409 includes request validation 409A, authorization and auditing 409B, account and profile management 409C, inventory management 409D, capacity management 409E, network provisioning 409F, credit check validator 409G, billing 409H, seller API integration 409I, location 409J, trouble ticket management 409K, localization 409L, usage statistics 409M, recommendation 409N, schedulers and batch processors 409O, notifications 409P, error parser 409Q, and content management 409R. Seller API integration 409I may enable orchestration engine 407 to invoke software interfaces of seller applications of CSPs to, e.g., request that the seller application confirm addition or deletion of virtual circuits (as requested by the NSP/customer) on behalf of the seller.

In accordance with techniques described in this disclosure, virtual circuits 406E may in some examples provide virtual circuit configuration status-based event-driven updates that are not responsive to virtual circuit configuration requests from applications 402A, 402B, but rather are initiated by the virtual circuit management 408E platform service in response to the virtual circuit management 408E platform service determining that a virtual circuit management workflow has transitioned to a new state. For example, buyer application 402A may use virtual circuits 406E to configure a virtual circuit in a cloud exchange to interconnect multiple private networks. In the illustrated example, buyer application 402A sends a virtual circuit configuration request 411A to API gateway 403 to invoke the virtual circuits 406E endpoint. The virtual circuit configuration request 411A may represent an example instance of any of the Buyer API virtual circuit requests described above used to configure a virtual circuit, such as POST/create, PATCH/update, and DELETE/delete.

The virtual circuit management 408E platform service of orchestration engine 407 receives, from API gateway 403, virtual circuit configuration requests to virtual circuit endpoint 406E and executes corresponding workflows to invoke cloud exchange API services 409 to satisfy the virtual circuit configuration requests. For example, a POST request to create a virtual circuit may correspond to a virtual circuit creation workflow and a DELETE request to delete a virtual circuit may correspond to a virtual circuit deletion workflow. Workflows for virtual circuit management 408E cause orchestration engine 407 to invoke cloud exchange API services 409 to perform operations of the workflow. For example, to create a new virtual circuit, the orchestration engine 407 may invoke the network provisioning service 409F and the billing service 409H, among other services 409.

A response from any of services 409 may cause the workflow to transition the workflow state machine to a new state that is accorded a particular virtual circuit status for the virtual circuit being configured. In response to this transition event, virtual circuit status update module 419 of orchestration engine 407 may send a virtual circuit status update message 413A with an indication of the new virtual circuit status. In some cases, the virtual circuit status update message 413A may also include an indication of the previous virtual circuit status.

Example virtual circuit statuses indicating a state of a virtual circuit configuration creation operation as a virtual circuit creation workflow proceeds may include "create," "pending provisioning," "provisioned," "pending billing," and "start billing." The "create" virtual circuit status may indicate that the exchange provider has received the virtual circuit configuration request to create the virtual circuit. The "pending provisioning" virtual circuit status may indicate that the exchange provider has initiated provisioning the virtual circuit in the cloud exchange network infrastructure according to the virtual circuit configuration request. The "provisioned" virtual circuit status may indicate that the exchange provider has completed provisioning the virtual circuit in the cloud exchange network infrastructure according to the virtual circuit configuration request, and that the virtual circuit may be usable by the requesting customer. The "pending billing" virtual circuit status may indicate that the exchange provider has completed provisioning the virtual circuit and has initiated an accounting sub-system (e.g., via billing 409H) to begin charging the customer for the virtual circuit. The "start billing" virtual circuit status may indicate that the accounting sub-system has begun charging the customer for the virtual circuit.

Example virtual circuit statuses indicating a state of a virtual circuit configuration deletion operation as a virtual circuit deletion workflow proceeds may include "request delete," "pending de-provisioning," "de-provisioned," "pending stop billing," and "stop billing." The "request deletion" virtual circuit status may indicate that the exchange provider has received the virtual circuit configuration request to delete or "de-provision" a virtual circuit. The "pending de-provisioning" virtual circuit status may indicate that the exchange provider has initiated de-provisioning the virtual circuit in the cloud exchange network infrastructure according to the virtual circuit configuration request. The "de-provisioned" virtual circuit status may indicate that the exchange provider has completed de-provisioning the virtual circuit in the cloud exchange network infrastructure according to the virtual circuit configuration request, and that the virtual circuit may no longer be usable by the requesting customer. The "pending stop billing" virtual circuit status may indicate that the exchange provider has initiated an accounting sub-system (e.g., via billing 409H) to stop charging the customer for the virtual circuit. The "stop billing" virtual circuit status may indicate that the accounting sub-system is no longer charging the customer for the virtual circuit.

In some examples, the virtual circuit status update message 413A may include the virtual circuit configuration status as a response parameter, such as the "status" parameter described below:

| status | |
|---|---|
| Description | Status of the virtual circuit. |
| Type | string |
| Default | None |
| Example | PROVISIONED |
| Required | No |

As noted above, virtual circuit status update message 413A may also include an indication of the previous virtual circuit status, as described below:

| previous_status | |
|---|---|
| Description | Status of the virtual circuit prior to the status indicated by the status parameter. |
| Type | string |
| Default | None |
| Example | PENDING PROVISIONING |
| Required | No |

In some examples, virtual circuit status updates message 413A may include a payload similar to that described above for a response for the GET virtual circuit operation for virtual circuits 406E. In some examples, the response also includes a previous status parameter to indicate the previous virtual circuit configuration status. An example response for an HTTP POST payload is as follows, and represents a JSON-formatted response. HTTP payloads may include XML-formatted or other representation-formatted responses in some examples of virtual circuit status updates:

"virtualcircuits": [
{
  "bandwidth": "Up to 200 MB",
  "buyer_port": "Reliance-AA-01",
  "buyer_vlan": "21",
  "cloud_service_name": "AZURE",
  "created_by": "test user",
  "created_date": "10-16-2014 17:06:18",
  "cross_connect_id": "11391111-A",
  "email": "test@test.com",
  "ibx_name": "SV3",
  "id": "6E58413576E51111111",
  "metro_code": "SV",
  "metro_name": "BAYM",
  "name": "TEST12",
  "port_speed": 100,
  "seller_port": "06ABC-CIS",
  "service_key": "87f4f12c0123-1111-abcdef",
  "previous_status": "Pending Provisioning",
  "status": "Provisioned",
}
]

Virtual circuit status update module 419 for orchestration engine 407 sends virtual circuit status update message 413A in response to events that indicate a new status for a virtual circuit being configured according to a virtual circuit configuration request, and not in response to requests for the virtual circuit status received from the customer. However, if virtual circuit endpoint 406E receives a request for a virtual circuit status (e.g., a GET request for one or more virtual circuits), virtual circuit status update module 419 may respond with the virtual circuit status (and other information describing the virtual circuit).

In the illustrated example, API gateway 403 relays virtual circuit status update message 413A to buyer application 402A. In some cases, API gateway 403 (or other system that exposes the endpoints 406 for the interconnection platform) may send virtual circuit status update message 413A to buyer application 402A via a previous HTTP session initiated by the buyer application 402A for virtual circuit configuration request 411A. Buyer application 402A and API gateway 403 maintain a TCP communication session for the HTTP session in order that API gateway 403 may send event-driven virtual circuit status updates to buyer application 402A. In this way, buyer application 402A may receive near real-time virtual circuit status updates without having to poll the virtual circuits 406E endpoint.

In some examples, methods for virtual circuits endpoint 406E may include a virtual circuit notification parameter by which a requesting customer system may provide an indication of a computing device for the customer system at which to receive event-driven virtual circuit status updates from orchestration engine 407 via API gateway 403. The virtual circuit notification parameter may be used for a user-defined HTTP callback in which, for instance, API gateway 403 sends virtual circuit status update message 413A to buyer application 402A at a URI specified by the buyer application in virtual circuit configuration request 411A. The URI may resolve to the computing device, for example. The virtual circuits 406E endpoint described above may in such cases be extended to include the virtual circuit notification parameter, notification, to indicate a computing device for a customer system at which to send virtual circuit status updates.

| notification | |
|---|---|
| Description | Virtual circuit notification location |
| Type | Object |
| Required | No |
| Default | None |
| Example | http://userdomain.com/vc |

The POST request to a Virtual Circuit endpoint may therefore be modified as indicated by the following example sample request.

Sample Request
POST http://<HostName>/ecx/v2/virtualcircuits
Authorization: Bearer <accessToken>
Accept: application/xml or application/json
{
  "metro_name":"Silicon Valley",
  "metro_code":"SV",
  "cloud_service_name":"CSP_A_1",
  "primary_vc_name":"twtca93", "primary_port_name":"GSE_QA-SJC-06GMR-CIS-2-SEC-A",
"primary_vlan_id":"188",
"secondary_vc_name":"twtcp94",
"secondary_port_name":"GSE_QA-SJC-06GMR-CIS-2-SEC-B",
"secondary_vlan_id":"188",
"service_key":"xxxxxxxx-xxxx-xxxx-xxxx-xxxxxxxxxxxx",
"virtual_circuit_speed":"Up to 200 MB",
"notification": {
"email": test@cloudexchange.com,
"push_notification": {"oauth_uri": "http://userdomain.com/oauth",
"authorization_key": "sdfsadfasd", "authorization_secret": "sdfsadfasd",
"callback": "http://userdomain.com/vc/notify"}
}
"metadata"
}

Virtual circuit status update 419 may store the virtual circuit notification parameter for buyer application 402A to registration data 415. In the above example, virtual circuit status update module 419 may generate virtual circuit status update 413A as an HTTP POST request that is directed to the indicated location for buyer application 402A (e.g., "http://userdomain.com/vc/notify") and includes an HTTP POST payload that indicates the status of the virtual circuit being configured. The location in the above example is indicated by a callback parameter within a push notification parameter object within the notification parameter object.

Although primarily described above with respect to a buyer application 402A, for a purchaser of cloud services, that receives event-driven virtual circuit status updates 413A from an interconnection platform, the techniques described above apply similarly to the seller application 402B, for a seller of cloud services, to receive event-driven virtual circuit status updates 413B from the interconnection platform.

In some examples, orchestration engine 407 may generate a virtual circuit status update to indicate a real-time bandwidth threshold notification that indicates a virtual circuit has exceeded, or is approaching, an allocated bandwidth for the virtual circuit. In such examples, the virtual circuit status update may not be responsive to a virtual circuit configuration request but may be, instead, generated by the orchestration engine 407 in response to detecting the threshold for the allocated bandwidth has been reached by network traffic transported using the virtual circuit. A customer system that receives a virtual circuit status update indicating a bandwidth threshold notification for a virtual circuit may be provisioned with a policy to dynamically generate and send a virtual circuit configuration request for the virtual circuit to increase the bandwidth for the virtual circuit, purchase additional ports or additional virtual circuits, or otherwise request more bandwidth in the cloud exchange from the interconnection platform.

Figure 4:
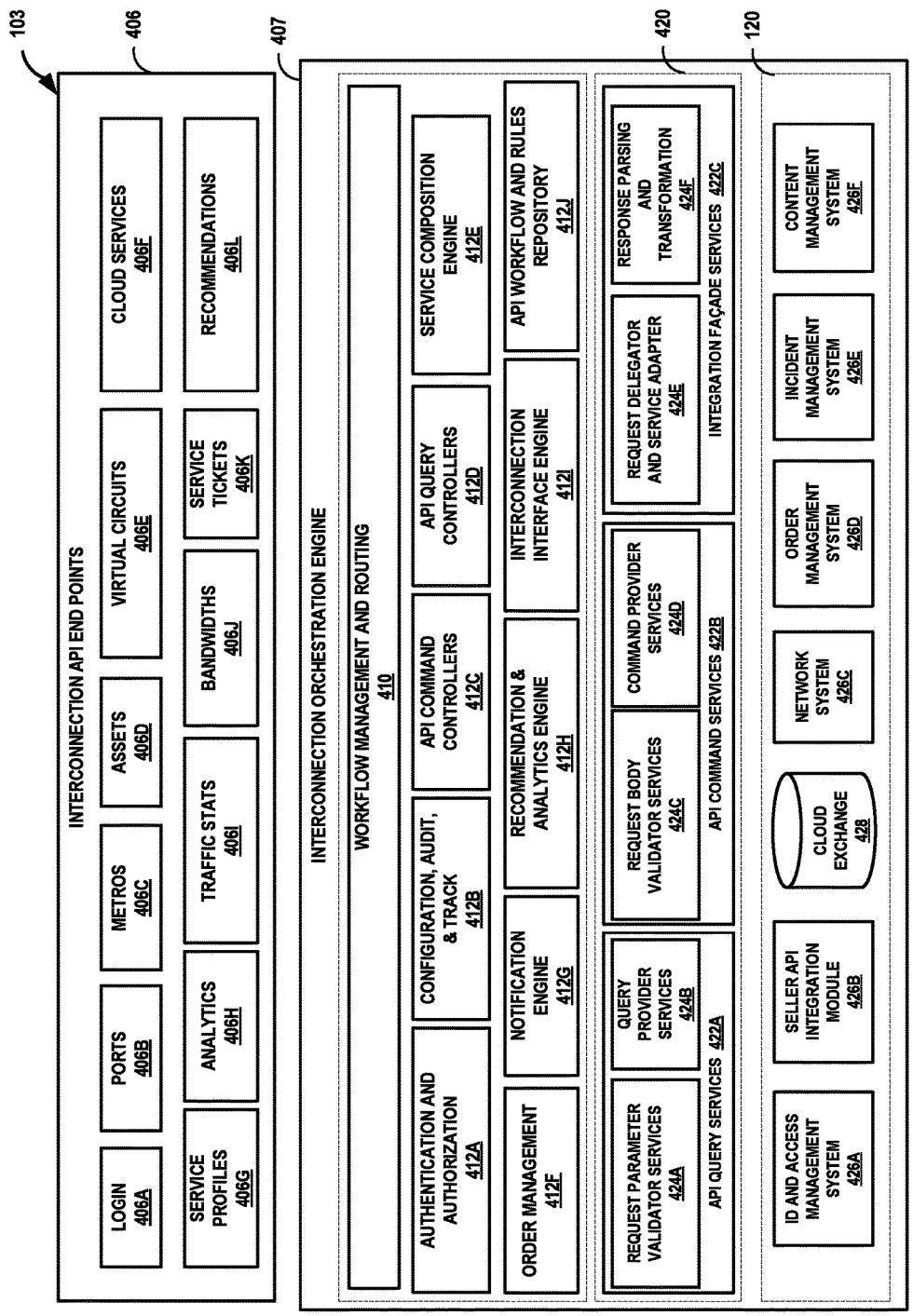
FIG. 4 is a block diagram showing an alternative representation of an interconnection platform for a cloud exchange according to techniques described in this disclosure.

FIG. 4 is a block diagram showing an alternative representation of an interconnection platform 103 for a cloud exchange according to techniques described in this disclosure. In this diagram, the technical architecture for interconnection platform 103 includes an API services layer 420 for validating and satisfying API queries, validating and satisfying API commands, and integrating subsystems 120 with the interconnection orchestration engine 407. One or more real servers and/or virtual machines of a data center may execute each of interconnection orchestration engine 407, services of API services layer 420, and sub-systems 120. Interconnection API endpoints 406 are example API endpoints by which API consumers 402 (FIG. 3A) may manage cloud exchange interconnections.

Workflow management and routing component 410 manages workflows and routes API calls to endpoints 406 to engines 412A-412J (collectively, "engines 412") that perform consolidated functionality by invoking various microservices of API services layer 420. Engines 412 include authentication and authorization engine 412A; configuration, audit, and tracking engine 412B; API command controllers 412C; API query controllers 412D; service composition engine 412E; order management engine 412F; notification engine 412G; recommendation and analytics engine 412H; interconnection interface engine 412I; and API workflow and rules repository 412J.

Examples API services of API services layer, as illustrated, include API query services 422A having request parameter validator services 424A and query provider services 424B; API command services 422B having request body validator services 424C and command provider services 424D; and integration façade services 422C having request delegator and service adapter 424E and response parsing and transformation 424F.

Examples of sub-systems 120 are illustrated in FIG. 4. Identification and access management system 426A performs authentication and authorization to valid access to the interconnection platform services. Seller API integration module 426B facilitates integration of the interconnection platform 103 with cloud service provider APIs for creating and validating interconnections with cloud service provider networks, as described elsewhere herein. Cloud exchange database 428 represents a configuration database describing the configuration of the cloud exchange managed by interconnection platform 103. Network system 426C provisions, configures, queries, and otherwise controls the network infrastructure of the cloud exchange managed by interconnection platform 103. Order management system 426D performs end-to-end management of customer orders for, e.g., virtual circuits. Incident management system 426E facilitates handling errors in the cloud exchange managed by interconnection platform, such as by alerting the cloud exchange provider, notifying customers, etc. Content management system 426F manages content for the interconnection platform 103.

Orchestration engine 407 orchestrates workflows to satisfy virtual circuit configuration requests and provides event-driven virtual circuit status updates to requesting systems. More specifically, notification engine 412G may be configured to receive indications of updated virtual circuit statuses, from other engines and services orchestrated by orchestration engine 407, and generate virtual circuit status updates as described elsewhere herein to provide near real-time status updates for virtual circuit configuration operations.

Figure 5:
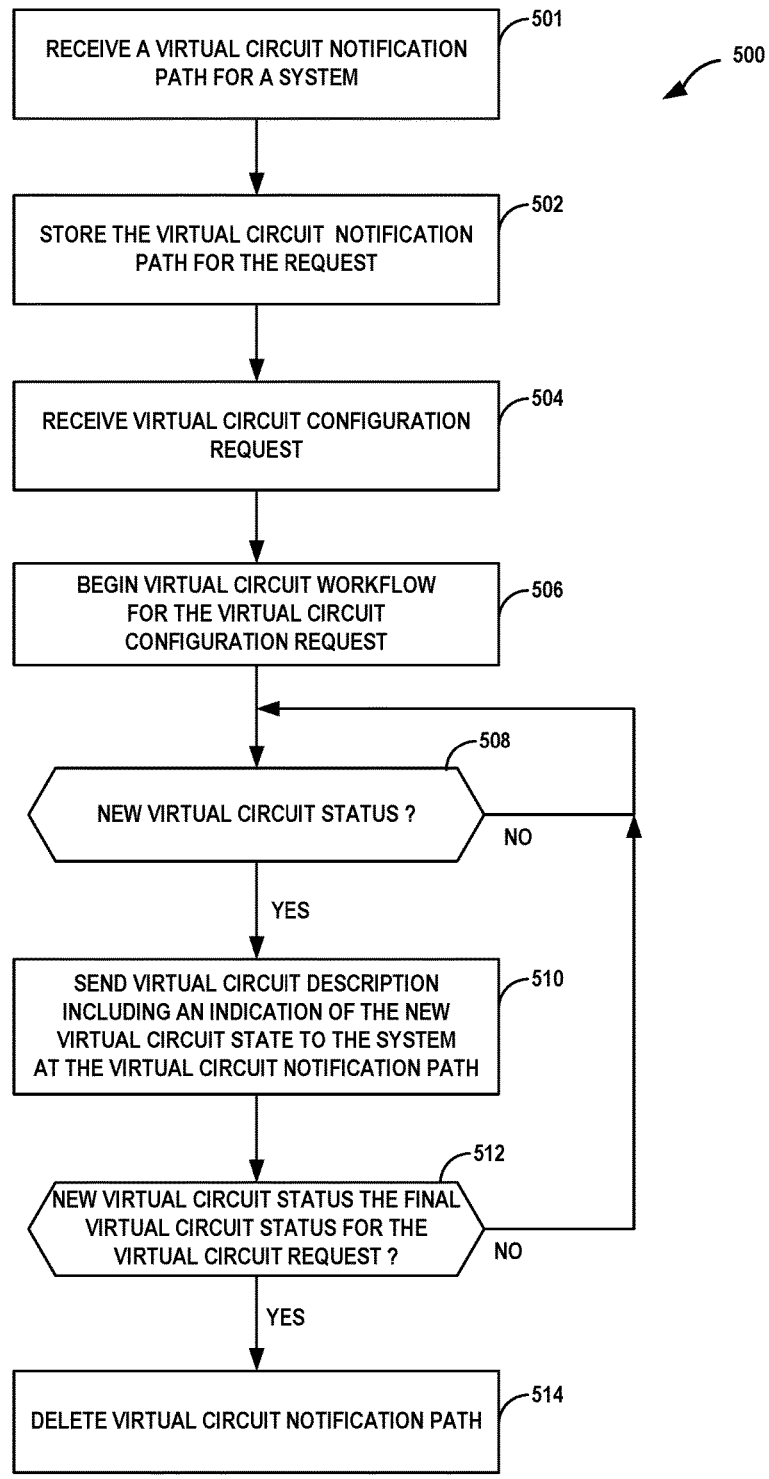
FIG. 5 is a flowchart illustrating an example mode of operation for an interconnection platform for a cloud exchange, according to techniques described in this disclosure.

FIG. 5 is a flowchart illustrating an example mode of operation for an interconnection platform for a cloud exchange, according to techniques described in this disclosure. Although the example mode of operation 500 is described for purposes of example with respect to interconnection platform 103 of FIG. 1B, the mode of operation 500 may be performed by any interconnection platform architecture described in this disclosure.

Interconnection platform 103 receives, via one of endpoints 116 of APIs 114 from one of applications 130, an indication of a virtual circuit notification path for the application 130 (501). The virtual circuit notification path may specify or otherwise indicate a computing device to which to send notifications regarding a status of the virtual circuit, such as by way of an IP address or URI, for example. Interconnection platform 103 stores the virtual circuit notification path and associates the virtual circuit notification path with the session by which the platform receives a virtual circuit configuration request 136 (502). Interconnection platform 103 receives, from the application 130, a virtual circuit configuration request 136 to configure a virtual circuit in a cloud exchange (504).

In response to receiving the virtual circuit configuration request 136, orchestration engine 118 orchestrates a workflow to configure the virtual circuit according to the virtual circuit configuration request 136 (506). While performing the workflow, orchestration engine 118 may determine that the workflow has transitioned to a new state having a virtual circuit status that is different than a previous virtual circuit status for the virtual circuit being configured (YES branch of 508). In response to determining that the workflow has transitioned to a new state, orchestration engine 118 generates a virtual circuit status update having a virtual circuit description including an indication of the new virtual circuit status, and orchestration engine 118 sends the virtual circuit status update to the computing device indicated by the virtual circuit notification path (510). If the new virtual circuit status represents a terminal or final status for the virtual circuit (e.g., "start billing" or "stopped billing" or "complete", etc.) (YES branch of 514), orchestration engine 118 may delete the stored virtual circuit notification path because the virtual circuit configuration operation is complete and no further status notifications are needed (514). Otherwise (NO branch of 514), orchestration engine 118 continues executing the workflow and identifying updates to the virtual circuit status (508).

Figure 6:
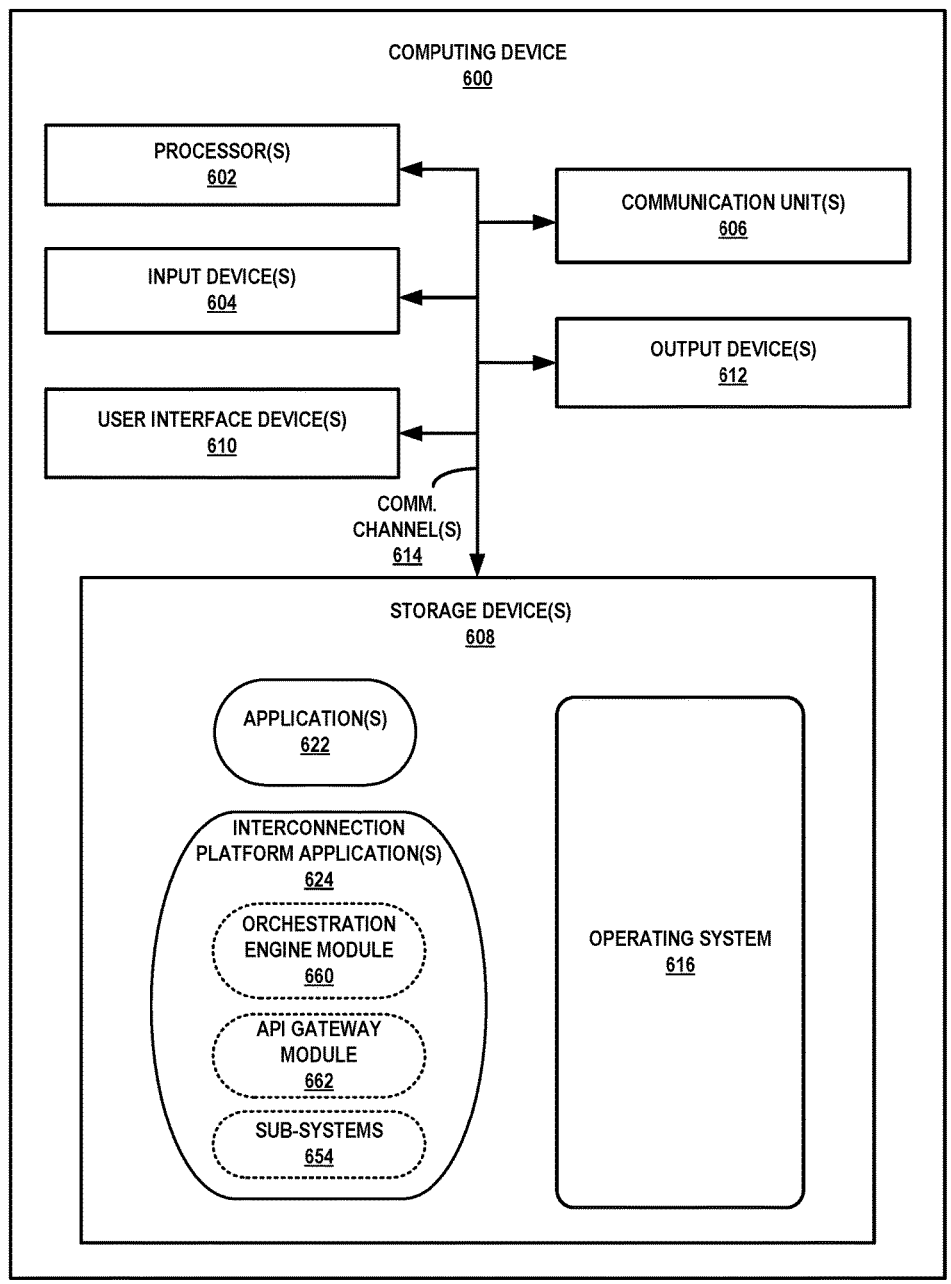
FIG. 6 is a block diagram illustrating further details of one example of a computing device that operates in accordance with one or more techniques of the present disclosure.

FIG. 6 is a block diagram illustrating further details of one example of a computing device that operates in accordance with one or more techniques of the present disclosure. FIG. 6 may illustrate a particular example of a server or other computing device 600 that includes one or more processor (s) 602 for executing any one or more of API gateway 112/403, orchestration engine 118/407, sub-systems 120, or any other computing device described herein. Other examples of computing device 600 may be used in other instances. Although shown in FIG. 6 as a stand-alone computing device 600 for purposes of example, a computing device may be any component or system that includes one or more processors or other suitable computing environment for executing software instructions and, for example, need not necessarily include one or more elements shown in FIG. 6 (e.g., communication units 606; and in some examples components such as storage device(s) 608 may not be co-located or in the same chassis as other components). Computing device 600 may be located and execute, for example, within any of cloud exchange points 128, another interconnection facility, or at a branch office or cloud computing environment employed or used by a cloud exchange provider. Multiple computing devices 600 may execute corresponding instances of interconnection platform applications 624 in a distributed manner. In some cases, each of the multiple computing devices 600 may execute different combinations of interconnection platform applications 624. In other words, a computing device 600 may not execute each of interconnection platform applications 624.

As shown in the specific example of FIG. 6, computing device 600 includes one or more processors 602, one or more input devices 604, one or more communication units 606, one or more output devices 612, one or more storage devices 608, and user interface (UI) device 610, and communication unit 606. Computing device 600, in one example, further includes one or more applications 622, interconnection platform applications 624, and operating system 616 that are executable by computing device 600. Each of components 602, 604, 606, 608, 610, and 612 are coupled (physically, communicatively, and/or operatively) for inter-component communications. In some examples, communication channels 614 may include a system bus, a network connection, an inter-process communication data structure, or any other method for communicating data. As one example, components 602, 604, 606, 608, 610, and 612 may be coupled by one or more communication channels 614. Computing device 600 may be located and execute, for example, within any of cloud exchange points 128, another interconnection facility, or at a branch office or cloud computing environment employed or used by a cloud exchange provider.

Processors 602, in one example, are configured to implement functionality and/or process instructions for execution within computing device 600. For example, processors 602 may be capable of processing instructions stored in storage device 608. Examples of processors 602 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 608 may be configured to store information within computing device 600 during operation. Storage device 608, in some examples, is described as a computer-readable storage medium. In some examples, storage device 608 is a temporary memory, meaning that a primary purpose of storage device 608 is not long-term storage. Storage device 608, in some examples, is described as a volatile memory, meaning that storage device 608 does not maintain stored contents when the computer is turned off. Examples of volatile memories include random access memories (RAM), dynamic random access memories (DRAM), static random access memories (SRAM), and other forms of volatile memories known in the art. In some examples, storage device 608 is used to store program instructions for execution by processors 602. Storage device 608, in one example, is used by software or applications running on computing device 600 to temporarily store information during program execution.

Storage devices 608, in some examples, also include one or more computer-readable storage media. Storage devices 608 may be configured to store larger amounts of information than volatile memory. Storage devices 608 may further be configured for long-term storage of information. In some examples, storage devices 608 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication units 606. Computing device 600, in one example, utilizes communication units 606 to communicate with external devices via one or more networks, such as one or more wired/wireless/mobile networks. Communication units 606 may include a network interface card, such as an Ethernet card, an optical transceiver, a radio frequency transceiver, or any other type of device that can send and receive information. Other examples of such network interfaces may include 3G and WiFi radios. In some examples, computing device 600 uses communication unit 606 to communicate with an external device.

Computing device 600, in one example, also includes one or more user interface devices 610. User interface devices 610, in some examples, are configured to receive input from a user through tactile, audio, or video feedback. Examples of user interface devices(s) 610 include a presence-sensitive display, a mouse, a keyboard, a voice responsive system, video camera, microphone or any other type of device for detecting a command from a user. In some examples, a presence-sensitive display includes a touch-sensitive screen.

One or more output devices 612 may also be included in computing device 600. Output device 612, in some examples, is configured to provide output to a user using tactile, audio, or video stimuli. Output device 612, in one example, includes a presence-sensitive display, a sound card, a video graphics adapter card, or any other type of device for converting a signal into an appropriate form understandable to humans or machines. Additional examples of output device 612 include a speaker, a cathode ray tube (CRT) monitor, a liquid crystal display (LCD), or any other type of device that can generate intelligible output to a user.

Computing device 600 may include operating system 616. Operating system 616, in some examples, controls the operation of components of computing device 600. For example, operating system 616, in one example, facilitates the communication of one or more applications 622 and interconnection platform application(s) 624 with processors 602, communication unit 606, storage device 608, input device 604, user interface devices 610, and output device 612.

Application 622 and interconnection platform application(s) 624 may also include program instructions and/or data that are executable by computing device 600. Example interconnection platform application(s) 624 executable by computing device 600 may include any one or more of orchestration engine module 660, API gateway module 662, and sub-systems 654, each illustrated with dashed lines to indicate that these may or may not be executable by any given example of computing device 600.

Orchestration engine module 660 may include instructions for causing computing device to perform one or more of the operations and actions described in the present disclosure with respect to orchestration engine 118 and orchestration engine 407 or other orchestration engine described herein. As one example, orchestration engine module 660 may include instructions that cause computing device 600 to organize, direct and integrate underlying software sub-systems of the interconnection platform for a cloud exchange for managing various aspects of interconnection within the network infrastructure as well as cloud services management, and to provide event-driven virtual circuit status updates to requesting systems in accordance with the techniques of this disclosure. The orchestration engine module 660 may, for example, provide a rule-drive workflow engine that operates between the APIs and the underlying interconnect platform of a cloud exchange that includes sub-systems and network infrastructure.

API gateway module 662 may include instructions for causing computing device to perform one or more of the operations and actions described in the present disclosure with respect to API gateway 112 and API gateway 403 or other API gateway described herein. As one example, API gateway module 403 may include instructions that cause computing device 600 to expose a collection of software interfaces, e.g., APIs 114, that define the methods, fields, and/or other software primitives by which applications may invoke the interconnection platform. These software interfaces allow carriers and customers programmable access to capabilities and assets of a cloud exchange.

Sub-systems 654 may include instructions for causing computing device to perform one or more of the operations and actions described in the present disclosure with respect to sub-systems 120.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
  receiving, by an interconnection platform for configuring a plurality of interconnection assets of a network data center and from a first customer system of a first customer of a provider of the network data center, a virtual circuit configuration request to configure a virtual circuit for the interconnection assets that interconnects a first customer network associated with the first customer and a second customer network associated with a second customer of the provider of the network data center,
wherein the virtual circuit configuration request comprises a plurality of parameters for the virtual circuit, wherein the plurality of parameters include a virtual circuit bandwidth parameter that specifies a bandwidth for the virtual circuit and a virtual circuit notification parameter that includes an indication of a computing device of the first customer system;
configuring, by the interconnection platform in response to the virtual circuit configuration request, the virtual circuit with the bandwidth for the virtual circuit according to a configuration workflow for the virtual circuit configuration request;
storing, by the interconnection platform, registration data associating the virtual circuit notification parameter with the virtual circuit;
sending, by the interconnection platform to the computing device of the first customer system indicated in the virtual circuit notification parameter of the registration data and in response to determining the configuration workflow has transitioned to a state having a virtual circuit status for the virtual circuit that differs from a previous virtual circuit status for the virtual circuit, a first virtual circuit status update that indicates the virtual circuit status; and
sending, by the interconnection platform after the virtual circuit has been configured and in response to determining that network traffic transported by the virtual circuit has exceeded a threshold for the bandwidth for the virtual circuit, to the computing device of the first customer system indicated in the virtual circuit notification parameter of the registration data, a second virtual circuit status update indicating the network traffic transported by the virtual circuit has exceeded the threshold for the bandwidth for the virtual circuit.

2. The method of claim 1,
wherein the interconnection assets comprise a switching fabric,
wherein the switching fabric includes a plurality of ports by which a plurality of networks connect to the switching fabric, each of the first customer network and second customer network having a different network address space,
wherein the virtual circuit comprises:
one of a layer 2 and layer 3 interface configured for a first port from the plurality of ports, by which the first customer network connects to the switching fabric; and
one of a layer 2 and layer 3 interface configured for a second port from the plurality of ports, by which the second customer network connects to the switching fabric.

3. The method of claim 1, further comprising:
executing, by one or more computing devices deployed by the provider within the network data center, the interconnection platform to present a software interface having a virtual circuits endpoint reachable by the first customer network and the second customer network,
wherein receiving the virtual circuit configuration request comprises receiving, by the interconnection platform via the software interface at the virtual circuits endpoint, the virtual circuit configuration request.

4. The method of claim 1,
wherein the indication of the computing device of the first customer system comprises an Internet Protocol (IP) address of the computing device,
wherein receiving the virtual circuit configuration request comprises receiving, by the interconnection platform via a HyperText Transfer Protocol (HTTP) session transported by a Transmission Control Protocol (TCP) session between the computing device of the first customer system and the interconnection platform, and
wherein sending the first virtual circuit status update comprises sending, by the interconnection platform via the HTTP session, the first virtual circuit status update.

5. The method of claim 1, wherein the indication of the computing device of the first customer system comprises a Uniform Resource Identifier (URI) that resolves to the computing device of the first customer system,
wherein sending the first virtual circuit status update comprises:
determining, by the interconnection platform from the registration data and in response to determining the configuration workflow has transitioned to the state having the virtual circuit status that differs from the previous virtual circuit status, the URI; and
sending, by the interconnection platform, the first virtual circuit status update to the computing device of the first customer system indicated by the URI.

6. The method of claim 1,
wherein the virtual circuit configuration request comprises a request to provision the virtual circuit to interconnect the first customer network and the second customer network, and
wherein the virtual circuit status comprises one of a pending provisioning virtual circuit status, a provisioned virtual circuit status, a pending billing virtual circuit status, and a start billing virtual circuit status.

7. The method of claim 1,
wherein the virtual circuit configuration request comprises a request to delete the virtual circuit, and
wherein the virtual circuit status comprises one of a pending de-provisioning virtual circuit status, de-provisioned virtual circuit status, pending stop billing virtual circuit status, and stop billing status virtual circuit status.

8. The method of claim 1, further comprising:
receiving, by the interconnection platform from the computing device of the first customer system, a request for a current virtual circuit status for the virtual circuit configuration request; and
sending, by the interconnection platform to the computing device of the first customer system and in response to the request for the virtual circuit status, a third virtual circuit status update that indicates the current virtual circuit status.

9. The method of claim 1, wherein the first virtual circuit status update comprises one of a HyperText Transfer Protocol (HTTP) request and an HTTP response having an HTTP body that includes the virtual circuit status formatted according to one of JavaScript Object Notation and eXtensible Markup Language.

10. The method of claim 1, wherein the first virtual circuit status update indicates the previous virtual circuit status.

11. The method of claim 1,
wherein the configuration workflow comprises a multi-step configuration operation comprising a plurality of states including the state having the virtual circuit status,
wherein an orchestration engine of the interconnection platform orchestrates a plurality of microservices of the interconnection platform according to the configuration workflow for the virtual circuit configuration request, wherein the orchestration engine transitions, in response to receiving a response from a microservice of the plurality of microservices, the configuration workflow to the state having the virtual circuit status, and wherein the orchestration engine determines that the configuration workflow has transitioned to the state having the virtual circuit status for the virtual circuit that differs from the previous virtual circuit status for the virtual circuit.

12. The method of claim 1, wherein an application programming interface gateway of the interconnection platform receives, via a software interface presented by the application programming interface gateway, the virtual circuit configuration request, and wherein an orchestration engine of the interconnection platform receives an indication of the virtual circuit configuration request from the application programming interface gateway and orchestrates a plurality of microservices of the interconnection platform according to the configuration workflow for the virtual circuit configuration request.

13. The method of claim 12, further comprising:

selecting, by the orchestration engine in response to determining the virtual circuit configuration request is a request to provision the virtual circuit to interconnect the first customer network and the second customer network, the configuration workflow from a plurality of configuration workflows, the configuration workflow for provisioning a virtual circuit.

14. A cloud exchange comprising:

a network data center comprising a plurality of interconnection assets, the interconnection assets comprising a plurality of ports by which a first customer network associated with a first customer of a provider of the network data center and a second customer network associated with a second customer of the provider of the network data center connect to the network data center;

an interconnection platform configured for execution by one or more management devices of the provider of the network data center to configure the interconnection assets, the interconnection platform configured to:

receive, from a first customer system of the first customer, a virtual circuit configuration request to configure a virtual circuit for the interconnection assets that interconnects the first customer network associated with the first customer and the second customer network associated with the second customer, wherein the virtual circuit configuration request comprises a plurality of parameters for the virtual circuit, wherein the plurality of parameters include a virtual circuit bandwidth parameter that specifies a bandwidth for the virtual circuit and a virtual circuit notification parameter that includes an indication of a computing device of the first customer system;

configure, in response to the virtual circuit configuration request, the virtual circuit with the bandwidth for the virtual circuit according to a configuration workflow for the virtual circuit configuration request;

store registration data associating the virtual circuit notification parameter with the virtual circuit;

send, to the computing device of the first customer system indicated in the virtual circuit notification parameter of the registration data and in response to a determination that the configuration workflow has transitioned to a state having a virtual circuit status for the virtual circuit that differs from a previous virtual circuit status for the virtual circuit, a first virtual circuit status update that indicates the virtual circuit status; and send, after the virtual circuit has been configured and in response to a determination that network traffic transported by the virtual circuit has exceeded a threshold for the bandwidth for the virtual circuit, to the computing device of the first customer system indicated in the virtual circuit notification parameter of the registration data, a second virtual circuit status update indicating the network traffic transported by the virtual circuit has exceeded the threshold for the bandwidth for the virtual circuit.

15. The cloud exchange of claim 14, wherein each of the first customer network and second customer network have a different network address space, wherein the virtual circuit comprises:

one of a layer 2 and layer 3 interface configured for a first port from the plurality of ports, by which the first customer network connects to the switching fabric; and one of a layer 2 and layer 3 interface configured for a second port from the plurality of ports, by which the second customer network connects to the switching fabric.

16. The cloud exchange of claim 14, further comprising:

one or more computing devices deployed by the provider within the network data center and configured to execute interconnection platform to present a software interface having a virtual circuits endpoint reachable by the first customer network and the second customer network, wherein the interconnection platform is configured to receive the virtual circuit configuration request via the software interface at the virtual circuits endpoint.

17. The cloud exchange of claim 14, wherein the indication of the computing device of the first customer system comprises an Internet Protocol (IP) address of the computing device, wherein the interconnection platform is configured to receive the virtual circuit configuration request via a HyperText Transfer Protocol (HTTP) session transported by a Transmission Control Protocol (TCP) session between the computing device of the first customer system and the interconnection platform, and wherein the interconnection platform is configured to send the first virtual circuit status update via the HTTP session.

18. The cloud exchange of claim 14, wherein the indication of the computing device of the first customer system comprises a Uniform Resource Identifier (URI) that resolves to the computing device of the first customer system, wherein the interconnection platform is configured to determine, from the registration data and in response to determining the configuration workflow has transitioned to the state having the virtual circuit status that differs from the previous virtual circuit status, the URI, and wherein the interconnection platform is configured to send the first virtual circuit status update to the computing device of the first customer system indicated by the URI.

19. The cloud exchange of claim 14, wherein the interconnection platform is configured to receive, from the computing device of the first customer system, a request for a current virtual circuit status for the virtual circuit configuration request, and wherein the interconnection platform is configured to send, to the computing device of the first customer system and in response to the request for the virtual circuit status, a third virtual circuit status update that indicates the current virtual circuit status.

20. The cloud exchange of claim 14, wherein the configuration workflow comprises a multi-step configuration operation comprising a plurality of states including the state having the virtual circuit status, wherein the interconnection platform comprises an orchestration engine configured to:

orchestrate a plurality of microservices of the interconnection platform according to the configuration workflow for the virtual circuit configuration request, and transition, in response to receiving a response from a microservice of the plurality of microservices, the configuration workflow to the state having the virtual circuit status;

determine that the configuration workflow has transitioned to the state having the virtual circuit status for the virtual circuit that differs from the previous virtual circuit status for the virtual circuit.

21. A system comprising:

a network data center comprising a plurality of interconnection assets, the interconnection assets comprising a plurality of ports by which a first customer network associated with a first customer of a provider of the network data center and a second customer network associated with a second customer of the provider of the network data center connect to the network data center;

an interconnection platform configured for execution by one or more management devices of the provider of the network data center to configure the interconnection assets, the interconnection platform comprising:

an application programming interface gateway configured to:

receive, from a first customer system of the first customer, a virtual circuit configuration request to configure a virtual circuit for the interconnection assets that interconnects the first customer network associated with the first customer and the second customer network associated with the second customer, wherein the virtual circuit configuration request comprises a plurality of parameters for the virtual circuit, wherein the plurality of parameters include a virtual circuit bandwidth parameter that specifies a bandwidth for the virtual circuit and a virtual circuit notification parameter that includes an indication of a computing device of the first customer system;

a plurality of microservices; and an orchestration engine configured to:

receive an indication of the virtual circuit configuration request from the application programming interface gateway;

orchestrate the plurality of microservices to configure the virtual circuit with the bandwidth for the virtual circuit according to a configuration workflow for the virtual circuit configuration request;

store registration data associating the virtual circuit notification parameter with the virtual circuit; and send, to the computing device of the first customer system indicated in the virtual circuit notification parameter of the registration data, via the application programming interface gateway, and in response to a determination that the configuration workflow has transitioned to a state having a virtual circuit status for the virtual circuit that differs from a previous virtual circuit status for the virtual circuit, a first virtual circuit status update that indicates the virtual circuit status;

send, after the virtual circuit has been configured and in response to a determination that network traffic transported by the virtual circuit has exceeded a threshold for the bandwidth for the virtual circuit, to the computing device of the first customer system indicated in the virtual circuit notification parameter of the registration data, a second virtual circuit status update indicating the network traffic transported by the virtual circuit has exceeded the threshold for the bandwidth for the virtual circuit.

* * * * *